(12) United States Patent
Thakur et al.

(10) Patent No.: US 12,087,995 B2
(45) Date of Patent: Sep. 10, 2024

(54) ANTENNA FOR AN ELECTRONIC DEVICE, AN ELECTRONIC DEVICE, A MOBILE DEVICE, A HINGE STRUCTURE, AND A METHOD FOR SELECTING AN ANTENNA

(71) Applicant: Intel Corporation, Santa Clara, CA (US)

(72) Inventors: Jayprakash Thakur, Bangalore (IN); Prasanna Pichumani, Bangalore (IN); Maruti Tamrakar, Tamil Nadu (IN); Doddi Raghavendra, Bangalore (IN); Sagar Gupta, Ghaziabad (IN)

(73) Assignee: Intel Corporation, Santa Clara, CA (US)

(*) Notice: Subject to any disclaimer, the term of this patent is extended or adjusted under 35 U.S.C. 154(b) by 264 days.

(21) Appl. No.: 17/455,928

(22) Filed: Nov. 22, 2021

(65) Prior Publication Data
US 2022/0200123 A1    Jun. 23, 2022

(30) Foreign Application Priority Data

Dec. 23, 2020  (EP) .................................. 20216823

(51) Int. Cl.
*H01Q 1/02* (2006.01)
*H01Q 1/12* (2006.01)
*H01Q 9/04* (2006.01)

(52) U.S. Cl.
CPC ............. *H01Q 1/02* (2013.01); *H01Q 1/12* (2013.01); *H01Q 9/04* (2013.01); *H01Q 9/0407* (2013.01)

(58) Field of Classification Search
CPC .......... H01Q 1/02; H01Q 1/12; H01Q 9/0407; H01Q 9/04
See application file for complete search history.

(56) References Cited

U.S. PATENT DOCUMENTS

| | | | | |
|---|---|---|---|---|
| 6,288,896 B1 * | 9/2001 | Hsu | ......................... | G06F 1/203 |
| | | | | 174/15.2 |
| 8,059,040 B2 * | 11/2011 | Ayala Vazquez | ........ | H01Q 1/02 |
| | | | | 343/702 |
| 2010/0053885 A1 * | 3/2010 | Ali | ......................... | G06F 1/1681 |
| | | | | 361/679.54 |
| 2014/0097992 A1 * | 4/2014 | Cheng | ................... | G06F 1/1698 |
| | | | | 343/702 |
| 2014/0361932 A1 * | 12/2014 | Irci | ...................... | H01Q 1/2266 |
| | | | | 343/702 |
| 2017/0373375 A1 | 12/2017 | Bologna et al. | | |
| 2018/0092253 A1 * | 3/2018 | Qiu | ...................... | G06F 1/1681 |
| 2019/0041922 A1 | 2/2019 | Kurma Raju et al. | | |
| 2020/0120832 A1 | 4/2020 | Doddi et al. | | |

FOREIGN PATENT DOCUMENTS

WO    2020/189986 A1    9/2020

* cited by examiner

*Primary Examiner* — Hai V Tran
(74) *Attorney, Agent, or Firm* — 2SPL Patent Attorneys PartG mbB; Kieran O'Leary

(57) ABSTRACT

Examples relate to concepts for antenna arrangement and particular to an antenna for an electronic device. An electronic device comprises, a case, a lid and a heat spreading structure. Further, an electronic device comprises a hinge arrangement between the case and the lid. The hinge arrangement comprises at least one hinge structure connecting the lid to the case. Further, the electronic device comprises an antenna. The antenna is arranged in an area of the hinge arrangement. The heat spreading structure extends from the case through the area of the hinge arrangement to the lid.

16 Claims, 17 Drawing Sheets

ANTENNA FOR AN ELECTRONIC DEVICE, AN ELECTRONIC DEVICE, A MOBILE DEVICE, A HINGE STRUCTURE, AND A METHOD FOR SELECTING AN ANTENNA

CROSS-REFERENCE TO RELATED APPLICATION

This application claims priority to European Application 20216823.3, filed on Dec. 23, 2020. The content of this earlier filed application is incorporated by reference herein in its entirety.

FIELD

Examples relate to concepts for antenna arrangements and particular to electronic devices, mobile devices, hinge structures and methods for selecting an antenna.

BACKGROUND

In an electronic device, e.g. a convertible or a clamshell system, compute and high-power devices may be arranged in one section, while another section may have relatively low power compute system. Thus, a cooling budget/device performance of the one section may be improved by extending a thermal solution to the other section, e.g. a display or compartment space, by usage of a cooling system. In addition, the device needs to transmit or receive signals wirelessly through antennas. An antenna designed for a chosen cooling system may be desired.

BRIEF DESCRIPTION OF THE FIGURES

Some examples of apparatuses and/or methods will be described in the following by way of example only, and with reference to the accompanying figures, in which

FIG. 4b shows a cutout of the heat spreading structure arranged between a supporting structure of a hinge arrangement from FIG. 4a;

DETAILED DESCRIPTION

Figure 1:
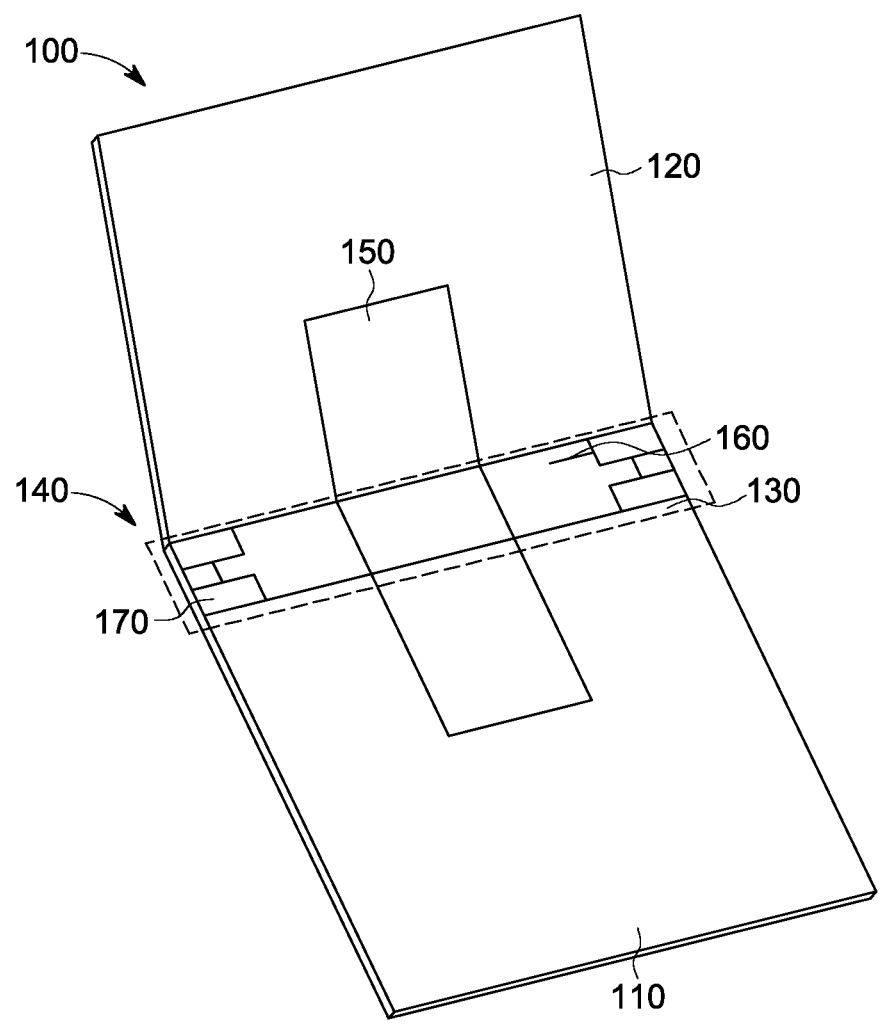
FIG. 1 shows a schematic view of an example of an electronic device.

From generation to generation the total system power as well as the power density of System-on-a-Chip (SoC) may increase to a significant percentage. Challenges may be to design thin and light foldable system with maximized SoC performance. In a typical foldable system, the compute and high-power devices may be arranged in one section, while the other section may house relatively low power components. Since display power and its temperature play an important role in maintaining the ergonomic limits, a cooling budget/device performance can be improved if the thermal solution may be extended to the secondary display or compartment space.

A cooling system to extend the thermal solution from one section (e.g. a case of an electronic device) to another section (e.g. a lid of an electronic device) used may be a thermal cross spread (TCS) sheet (e.g. a graphite material). TCS sheets may be used in fan-less systems as thermal solution. There may be challenges to place an antenna at a hinge side in such systems, due to a TCS sheet material, e.g. a semiconducting material, passing from case to lid of the electronic device. Thus, the antenna performance may be influenced by an arrangement of an antenna with respect to the TCS sheet. Therefore, there may be a need to improve an antenna design and/or an antenna arrangement if a TCS sheet is utilized as thermal solution in an electronic device.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of the group A and B". The same applies for combinations of more than two elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

FIG. 1 shows a schematic view of an example of an electronic device. The electronic device 100 comprises a case 110, a lid 120 and a heat spreading structure 150. Further, the electronic device 100 comprises a hinge arrangement 140 between the case 110 and the lid 120. Further, the hinge arrangement 140 comprises at least one hinge structure connecting the lid 120 to the case 110. Further, the electronic device 100 comprises an antenna 160. The antenna 160 is arranged in an area 130 of the hinge arrangement 140. Further, the heat spreading structure 150 extends from the case 110 through the area 130 of the hinge arrangement 140 to the lid 120.

The case 110 may be a base of an electronic device 100, e.g. of a laptop. Thus, compute and/or high-power devices may be arranged in the case 110. The lid 120 may be a housing for a display, e.g. of a laptop. Thus, a display may be arranged in the lid 120. Therefore, a temperature of the case may be stronger increased by the compute and/or high-power devices than a temperature of the lid by the display during operation of the electronic device, leading to a temperature gradient between case 110 and lid 120.

A heat spreading structure 150 may be used to transfer heat from the case 110 to the lid 120. The heat spreading structure 150 may be a TCS sheet (e.g. one or more graphite or graphene sheets or one or more metal sheets). The heat spreading structure 150 may be thermally coupled to a heat source (e.g. CPU) in the case 110. In this way, the heat spreading structure 150 may efficiently dissipate heat from the heat source to the lid 120.

The case 110 and the lid 120 may be connected by a hinge arrangement 140. The hinge arrangement 140 may comprise at least one hinge structure. For example, the hinge arrangement may comprise two hinge structures spaced apart from each other along an edge of the case 110 and/or the lid 120 (e.g. arranged at two corners of the edge of the case 110 and the lid 120, respectively). The hinge arrangement 140 may define a size of an area 130 of the hinge arrangement 130. The area 130 of the hinge arrangement may be spanned between outer dimensions of two hinge structures 170. Alternatively, the area 130 of the hinge arrangement 140 may be defined by a space between the case 110 and the lid 120 in an opened state of the electronic device 100. For example, the area 130 of the hinge arrangement 140 may be at defined by a maximum space between the case 110 and the lid 120 in an opened state of the electronic device 100.

For example, the antenna 160 may be arranged between two hinge structures of the hinge arrangement 140 or may be integrated in a hinge structure of the hinge arrangement 140. The antenna 160 may be arranged in the area 130 of the hinge arrangement 140, through which the heat spreading structure 150 extends. Thus, a radiation of the antenna 160 may be partially influenced, e.g. blocked, by the heat spreading structure 150. Therefore, a position for an arrangement of the antenna 160 in the area of the hinge arrangement 140 may be crucial to the performance of the antenna 160. For example, an arrangement of the antenna 160 in a distance to the heat spreading structure 150 may increase an antenna 160 performance in comparison to an antenna 160 arranged adjacent to the heat spreading structure 150. For example, an arrangement of the antenna 160 inside an opening of the heat spreading structure may improve an antenna 160 performance.

More details and aspects are mentioned in connection with the examples described below. The example shown in FIG. 1 may comprise one or more optional additional features corresponding to one or more aspects mentioned in connection with the proposed concept or one or more examples described below (e.g. FIGS. 2a-17).

Figure 2A:
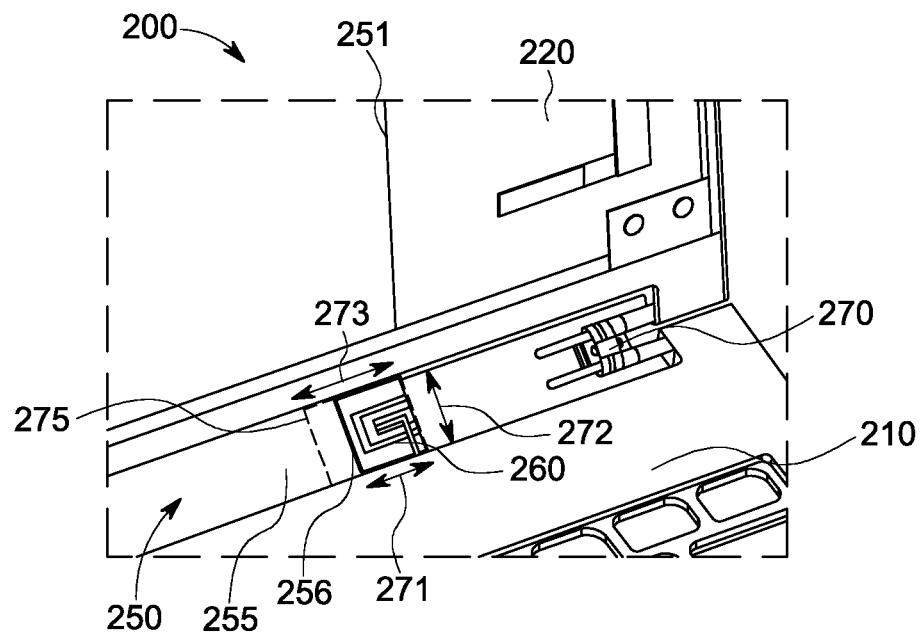
FIG. 2a shows a schematic view of a heat spreading structure with antenna.

FIG. 2a shows a schematic view of another example of the electronic device. The electronic device 200 may be implemented similar to the electronic device described in connection with FIG. 1. The electronic device 200 comprises a case 210, a lid 220 and a heat spreading structure 250. Further, the electronic device comprises an antenna 260 and a hinge structure 270.

The antenna 260 may be integrated into an opening 256 of the heat spreading structure 250. By integrating the antenna 260 into an opening 256 of the heat spreading structure 250 a required space for forming the antenna 260 may be reduced. Further, the opening 256 may be at arranged at any desired position of the heat spreading structure 250, leading to an improved flexibility of arranging the antenna 260. For example, the opening 256 (and thus the antenna 260) may be arranged at any desired position in the area of the hinge arrangement.

Alternatively, the antenna 260 may be formed on a surface 255 of the heat spreading structure 250. By forming the antenna 260 on a surface 255 of the heat spreading structure 250 a required space for forming the antenna 260 may be reduced. Further, the antenna 260 may be arranged at any desired position on the surface 255 of the heat spreading structure 250, leading to an improved flexibility of arranging the antenna 260. For example, the antenna 260 may be arranged at any desired position on the surface 255 of the heat spreading structure 250 in the area of the hinge arrangement.

The antenna 260 may be arranged in an edge region 275 of the heat spreading structure 250. The edge region 275 and/or the antenna 260 may be extend from an edge of the heat spreading structure 250 to a distance from the edge of at most 5% (or at most 10% or at most 15%) of a width the heat spreading structure 250. For example, the antenna 260 may be arranged at an edge 251 of the heat spreading structure 250.

The antenna 260 may be a flexible printed circuit (fpc) antenna. For example, the antenna 260 may be formed on a fpc substrate and the fpc substrate may be arranged in the opening 256. Thus, the antenna 260 may be manufacturable independent from the heat spreading structure 250.

The antenna 260 may be a slot antenna. For example, the antenna 260 may be formed by or comprise a slot opening. In this way, the antenna 260 may be easily integrated and/or may have low space consumption and/or may have a good beam characteristic.

Figure 2B:
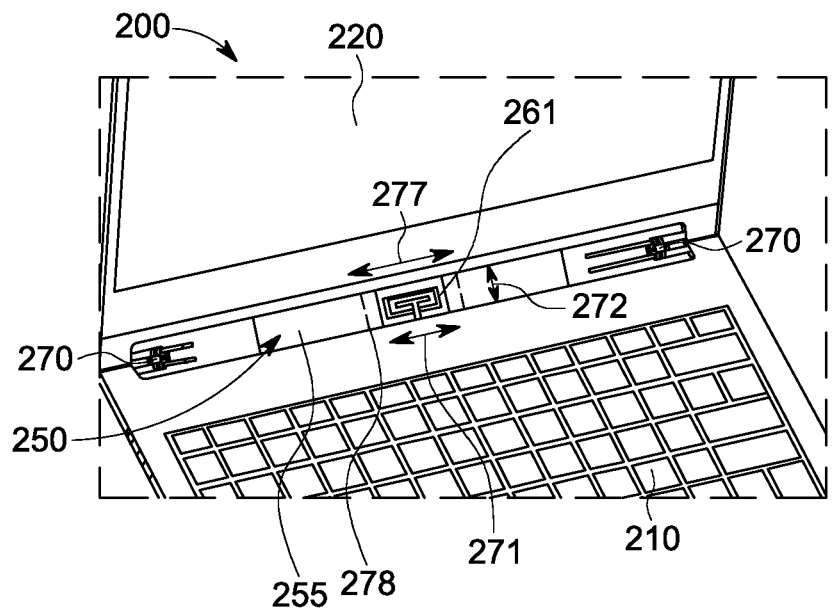
FIG. 2b shows a schematic view of another example of a heat spreading structure with antenna.
Figure 2C:
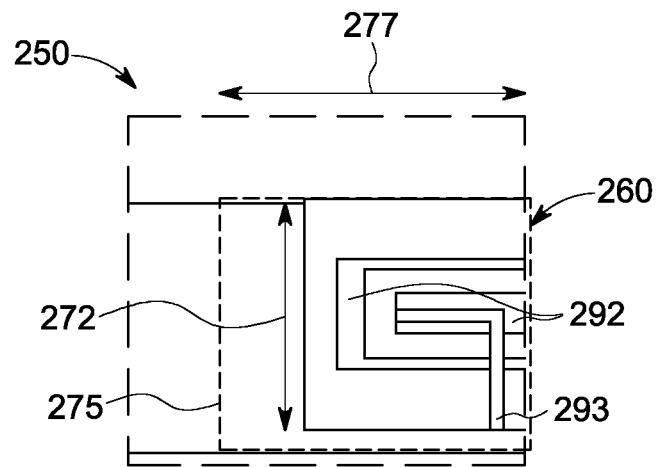
FIG. 2c shows a schematic view of an antenna integrated into a heat spreading structure.
Figure 2D:
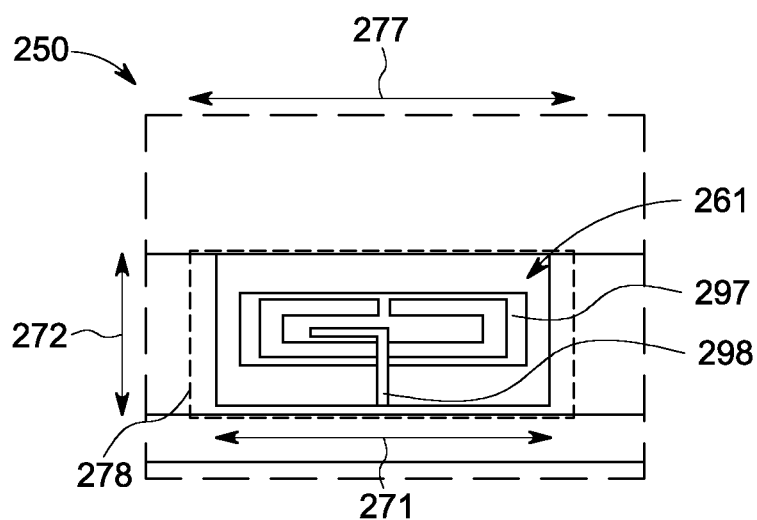
FIG. 2d shows a schematic view of another example of an antenna integrated into a heat spreading structure.

The antenna 260 may be a patch antenna (see FIGS. 2c and 2d). In this way, the antenna 260 may be easily integrated and/or may have low space consumption and/or may have a good beam characteristic.

The antenna 260 may have a surface area of at most 225 $mm^2$. For example, the surface area of the antenna may be at least 170 $mm^2$, or at least 190 $mm^2$, or at least 200 $mm^2$ and/or at most 250 $mm^2$, or at most 225 $mm^2$, or at most 210 $mm^2$.

An area of the antenna 260, e.g. the edge region 275 or the center region, may be metal painted to increase a conductivity. Thus, a performance of the antenna may be improved. Alternatively, the antenna 260 may be formed on a conductive fpc. The heat spreading structure 250, except of the edge region and/or the center region, if an antenna 260 is arranged in one of these regions, may be used for grounding the antenna 260. Thus, a grounding of the antenna 260 may be improved.

A gap between lid 220 and case 210, may provide a RF window (antenna may radiate undisturbed under a radiation angle) and may allow the antenna 260 to radiate in a desired direction. Further, a connection of the heat spreading structure 250 with the case 210 and/or lid 220 may provide a bigger ground plane for an antenna and may improve the antenna performance.

FIG. 2a may show an example of an antenna implementation on an edge 251 of a heat spreading structure 250, e.g. a graphite sheet. The antenna 260, e.g. a slot antenna or an antenna pattern, may be incorporated (e.g. by forming a slot opening) into the heat spreading structure 250, e.g. a graphite sheet, to get a desired resonance frequency band. The slot antenna or antenna pattern may be excited by another feed trace or coaxial cable (see FIGS. 2c and 2d). The (slot) antenna shown in FIG. 2 may have a width 271 of at least 10 mm, or at least 12 mm, or at least 14 mm and/or at most 19 mm, or at most 17 mm, or at most 15 mm and may have a height 272 of at least 10 mm, or at least 12 mm, or at least 14 mm and/or at most 19 mm, or at most 17 mm, or at most 15 mm. The heat spreading structure, e.g. a TCS, may be considered as ground plane.

The heat spreading structure 250 may be a graphite sheet for thermal distribution (e.g. system cooling) between case 210 and lid 220. A partial area on the graphite sheet near a barrel, e.g. the edge region 275 near a supporting structure, may be used to implement an antenna pattern—e.g. through a cut in graphite sheet—and metal painted to increases a conductivity or stick conductive fpc. The gap between lid and base, may provide a radio frequency window and may allow radiation of the antenna 260.

More details and aspects are mentioned in connection with the examples described above and/or below. The example shown in FIG. 2a may comprise one or more optional additional features corresponding to one or more aspects mentioned in connection with the proposed concept or one or more examples described above (e.g. FIG. 1) and/or below (e.g. FIGS. 2b-17).

FIG. 2b shows a schematic view of another example of a heat spreading structure with antenna. The electronic device 200 may be implemented similar to the electronic device described in connection with FIGS. 1 and/or 2a. The electronic device 200 comprises a case 210, a lid 220 and a heat spreading structure 250. Further, the electronic device comprises an antenna 261 and a hinge structure 270.

The antenna 261 may be arranged in a center region 278 of the heat spreading structure 250. The center region 278 may be defined by a rectangle arranged in a middle of the heat spreading structure 250. Alternatively, the rectangle of the center region 278 may be arranged in a middle of a part of the heat spreading structure 250 extending through the area of the hinge arrangement. The width 277 of the rectangle of the center region 278 may be at least 10% or at least 20% or at least 30% of a width the heat spreading structure 250. Alternatively, the width 277 of the rectangle of the center region 278 may be at least a width 271 of the antenna 261. For example, the antenna 261 may fit exactly with its width into the center region 278. For example, a center of the antenna 261 may be arranged at a center of the heat spreading structure 250.

The antenna 261 may have a surface area of at most 900 $mm^2$. For example, the surface area of the antenna may be at least 600 $mm^2$, or at least 700 $mm^2$, or at least 800 $mm^2$ and/or at most 1000 $mm^2$, or at most 900 $mm^2$, or at most 850 $mm^2$.

FIG. 2b shows an example of an antenna 261 implementation in a middle of a heat spreading structure 250, e.g. a graphite sheet. The antenna 261 can also be implemented in a center region 278 of the graphite sheet. The center region 278, e.g. a partial area, may have a width 273 of at least 24 mm, or at least 26 mm, or at least 28 mm and/or at most 34 mm, or at most 32 mm, or at most 30 mm and may have a height 272 of at least 10 mm, or at least 12 mm, or at least 14 mm and/or at most 19 mm, or at most 17 mm, or at most 15 mm. The center region 278 may be used to implement the antenna 261. The antenna 261 arranged in the middle—center region 278—of the heat spreading structure 250 may be twice as long as an antenna arranged on the side/edge—e.g. in an edge region.

More details and aspects are mentioned in connection with the examples described above and/or below. The example shown in FIG. 2b may comprise one or more optional additional features corresponding to one or more aspects mentioned in connection with the proposed concept or one or more examples described above (e.g. FIGS. 1-2a) and/or below (e.g. FIGS. 2c-17).

FIG. 2c shows a schematic view of an antenna integrated into a heat spreading structure. The antenna 260 may be formed by an antenna pattern 292 on the heat spreading structure 250. An outer dimension—width 271 and a height 272—of the antenna 260 may be greater as an outer dimension of the antenna pattern 292. The antenna pattern may be formed in an edge region 275. The (patch) antenna 260 may be fed by an antenna feed 293, which may be fed by another feed trace or coaxial cable (not shown).

More details and aspects are mentioned in connection with the examples described above and/or below. The example shown in FIG. 2c may comprise one or more optional additional features corresponding to one or more aspects mentioned in connection with the proposed concept or one or more examples described above (e.g. FIGS. 1-2*b*) and/or below (e.g. FIGS. 2*d*-17).

FIG. 2*d* shows a schematic view of another example of an antenna integrated into a heat spreading structure. The antenna 261 may be formed by an antenna pattern 297 on the heat spreading structure 250. An outer dimension—width 271 and a height 272—of the antenna 261 may be greater as an outer dimension of the antenna pattern 297. The antenna pattern 297 may be formed in a center region 278. The (patch) antenna 261 may be fed by an antenna feed 298, which may be fed by another feed trace or coaxial cable (not shown).

More details and aspects are mentioned in connection with the examples described above and/or below. The example shown in FIG. 2*d* may comprise one or more optional additional features corresponding to one or more aspects mentioned in connection with the proposed concept or one or more examples described above (e.g. FIGS. 1-2*c*) and/or below (e.g. FIGS. 3-17).

Figure 3:
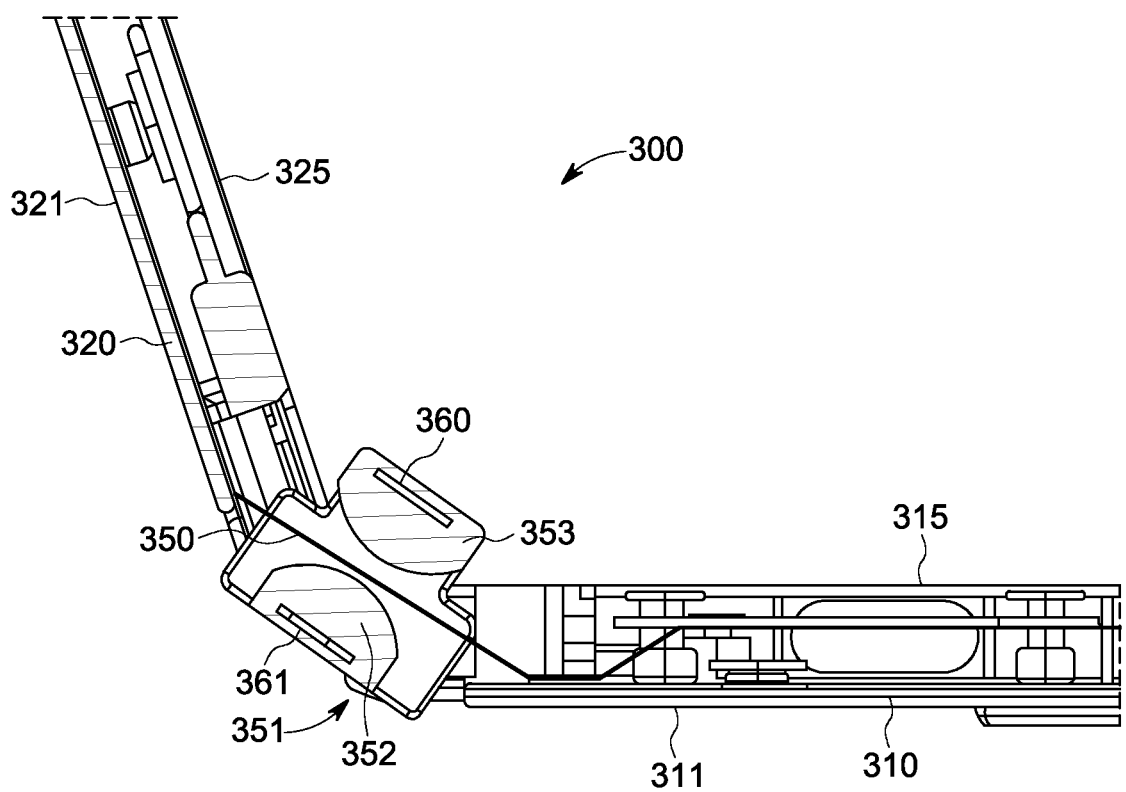
FIG. 3 shows a schematic side view of another example of an electronic device.

FIG. 3 shows a schematic side view of another example of an electronic device. The electronic device 300 may be implemented similar to the electronic device described in connection with or one or more examples of FIGS. 1-2*b*. The electronic device 300 comprises a case 310, a cover 315 for the case 310, a lid 320, a display 325 for the lid 320 and a heat spreading structure 350. Further, the electronic device 300 comprises a supporting structure 351, which supports a deformation of the heat spreading structure 350.

The hinge arrangement may further comprise a supporting structure 351, which supports a deformation of the heat spreading structure 350 during a relative movement of the lid 320 to the case 310. The supporting structure 351 of the hinge arrangement may ease a deformation of the heat spreading structure 350 during operation of the electronic device 300. The supporting structure 351 may be made of a non conducting material, e.g. plastic.

The antenna 360 may be integrated into the supporting structure 351. By integrating the antenna 360 into the supporting structure 351 an arrangement flexibility of the antenna 360 may be increased.

The supporting structure 351 may comprise an inner part 353 and an outer part 352. A shape of the inner part 353 and the outer part 352 may be a curved shape, e.g. a D-shape. A curved side of the inner part 353 and the outer part 352 may face the heat spreading structure 350. For example, the curved part of a D-shape may face the heat spreading structure 350. Thus, a deformation of the heat spreading structure 350 may be eased by the curved side of inner part 353 and the outer part 352.

The supporting structure 351 may extend along a first side and along a second side of the heat spreading structure 350. For example, the inner part 353 may extend along a side of the heat spreading structure 350 facing a user looking at the display 325 of the electronic device 300 and the outer part 352 may extend along a side of the heat spreading structure 350 facing a user looking at the case 310 or the lid 320. Thus, an antenna 360 may be arranged on a desired side of the heat spreading structure 350. For example, an antenna 360 may be arranged in the inner part 353, leading to an improved radiation of the antenna 360 for an opening state of the electronic device 300.

The electronic device 300 may further comprise a second antenna 361. The antenna 360 may be arranged on a first side of the heat spreading structure 350 and the second antenna 361 may be arranged on a second side of the heat spreading structure 350. By utilizing two antenna 360, 361 a radiation characteristic of the electronic device 300 may be improved. For example, a radiation of the antenna 360 may be blocked by the heat spreading structure 350 in a first radiation direction and a radiation of the second antenna 361 may be blocked by the heat spreading structure 350 in a second radiation direction. By arranging the two antenna 360, 361 on different sides of the heat spreading structure 350, e.g. in the inner part 353 and the outer part 352, the first radiation direction may be opposite to the second radiation direction. Thus, a radiation of the electronic device 300 may be improved by the two antennas 360, 361. For example, a radiation of each antenna 360, 361 may be blocked by the heat spreading structure 350 in a radiation direction, in which a radiation of the other antenna 360, 361 may be not blocked. Thus, the radiation radiated by the two antenna 360, 361 may cover an entire space around the electronic device 300.

The heat spreading structure 350 may transfer heat from a first region of the electronic device 300 to a second region of the electronic device 300. For example, the first region may be a region with compute and/or high-power devices, e.g. a region in the case 310, and the second region may be a region without compute and/or high-power devices, e.g. a region in the lid 320. Thus, the heat spreading structure 350 may homogenize a thermal distribution of the electronic device 300.

The heat spreading structure 350 may extend from a backside 311 of the case 310 to a backside 321 of the lid 320. The backside 311 of the case 310 may face a surface on which the electronic device 300 may be arranged. The backside 321 of the lid 320 may be averted away from a user of the electronic device 300 in an opening state. For example, compute and/or high-power devices may be arranged in a proximity of the backside 311 of the case 310, e.g. in a first region of the case 310, and in a proximity of the backside 321 of the lid 320 none compute and/or high-power devices may be arranged, e.g. in a second region of the lid 320. Thus, the heat spreading structure 350 may homogenize a thermal distribution of the electronic device 300.

The heat spreading structure 350 may extend from a region with a heat source in the case 310 to the lid 320. A heat source may be any electronic circuit producing heat, e.g. a compute or a high-power device. The heat source may be arranged in the first region. The heat source may be arranged in a proximity to the backside 311 of the case 310. The region of the heat source may be defined by a region, in which a temperature may be increased by at least 5° C. or at least 10° or at least 15° C. by the heat source. Thus, the heat spreading structure 350 may homogenize a thermal distribution of the electronic device 300.

The heat spreading structure 350 may be made of a conducting material. The heat spreading structure 350 may be made of a semi-conductive material. The heat spreading structure 350 may be made of graphite or metal. Thus, a heat transfer caused by the heat spreading structure 350 may be improved by a conductivity of the heat spreading structure 350.

The heat spreading structure 350 may be made in one piece. Thus, a manufacturing process of the electronic device 300 may be eased. Further, a heat transfer caused by a one-piece heat spreading structure 350 may be advantageously homogenous.

The heat spreading structure 350 may have a sheet structure. A thickness of the heat spreading structure 350 may be at most 1 mm. For example, the thickness may be at most 2 mm, or at most 1 mm, or at most 0.8 mm or at most 0.6 mm. Thus, the heat spreading structure 350 can be arranged with small space requirement, which may lead to a decrease in a width of the electronic device 300.

FIG. 3 shows an example of a side view of an antenna placement on a heat spreading structure, e.g. a TCS, and a supporting structure 351. The supporting structure 351 comprises an inner part 353 and an outer part 52, both also referred to as inner D-roller 353 and outer D-roller 352. There may be two D-roller 352, 353, so an antenna 260, 261 may be arranged on each D-roller (inner 353 and outer 352) over the heat spreading structure 350, e.g. a graphite sheet (TCS). Graphite may block the radiation from antenna, so two identical antennas may be arranged on a front and a back side of the TCS (inner 353 and outer D-roller 352). Thus, the radiation radiated by the two antenna 360, 361 may cover an entire space around the electronic device 300.

More details and aspects are mentioned in connection with the examples described above and/or below. The example shown in FIG. 3 may comprise one or more optional additional features corresponding to one or more aspects mentioned in connection with the proposed concept or one or more examples described above (e.g. FIGS. 1-2d) and/or below (e.g. FIGS. 4-17).

Figure 4A:
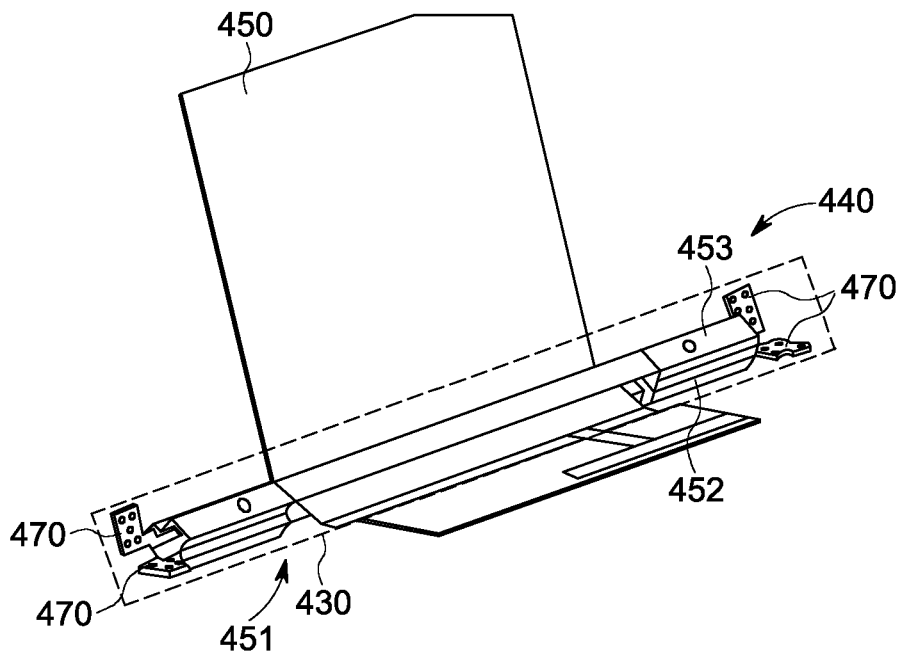
FIG. 4a shows a schematic view of a heat spreading structure arranged between a supporting structure of a hinge arrangement.

FIG. 4a shows a schematic view of a heat spreading structure arranged between a supporting structure of a hinge arrangement. The hinge arrangement 440 comprises a supporting structure 451 and two hinge structures 470. The supporting structure 451 comprises an inner part 453 and an outer part 452. The supporting structure 451 may be arranged in an area 430 of the hinge arrangement 440. The heat spreading structure 450 may extend through the area 430 of the hinge arrangement 440 and may be led through the supporting structure 451.

The area 430 of the hinge arrangement 440 may be limited by a hinge structure 470 each at two opposite sides and wherein the heat spreading 450 structure extends between the two hinge structures 470 through the area 430 of the hinge arrangement 440.

FIG. 4a shows an example of passive system with heat spreading structure 450, e.g. a graphite sheet, and a supporting structure 451, e.g. a D-roller barrel. The thermal solution (graphite sheet) may be used to spread heat below a display as well as on the case. The thermal solution may be called as thermal cross spread (TCS). Normally in cross spreading the graphite sheet may be extended and attached with a base (D-Cover), e.g. a case, and a lid (A-cover) for thermal cross heat spreading (TCS) as thermal solution in fan-less or passive cooling systems. The Barrel, e.g. supporting structure, may be separated at both sides of TCS and may have a D-shape, called as D-roller. FIG. 4a shows the system assembly of graphite sheet (thermal cross spreading) and D-roller barrel. The D-roller may be a plastic material and a Graphite sheet may be a semi-conductive material (thermal conducting material). The plastic D-roller may support a bending of the graphite sheet. For example, the graphite sheet may be bended with a fixed bending radius.

More details and aspects are mentioned in connection with the examples described above and/or below. The example shown in FIG. 4a may comprise one or more optional additional features corresponding to one or more aspects mentioned in connection with the proposed concept or one or more examples described above (e.g. FIGS. 1-3) and/or below (e.g. FIGS. 4b-17).

Figure 4B:
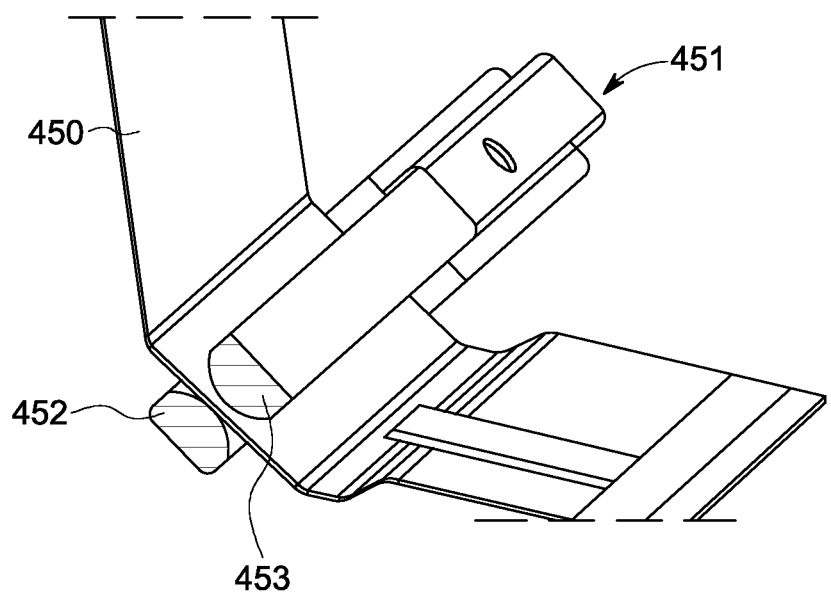

FIG. 4b shows a cutout of the heat spreading structure arranged between a supporting structure of a hinge arrangement from FIG. 4a. The supporting structure 451 comprises an inner part 453 and an outer part 452. The heat spreading structure 450 may be led through the supporting structure 451. The inner part 453 and the outer part 452 may have a D-shape. A curved side of the inner part 453 and the outer part 452 may face the heat spreading structure 450.

More details and aspects are mentioned in connection with the examples described above and/or below. The example shown in FIG. 4b may comprise one or more optional additional features corresponding to one or more aspects mentioned in connection with the proposed concept or one or more examples described above (e.g. FIGS. 1-4a) and/or below (e.g. FIGS. 5-17).

Figure 5A:
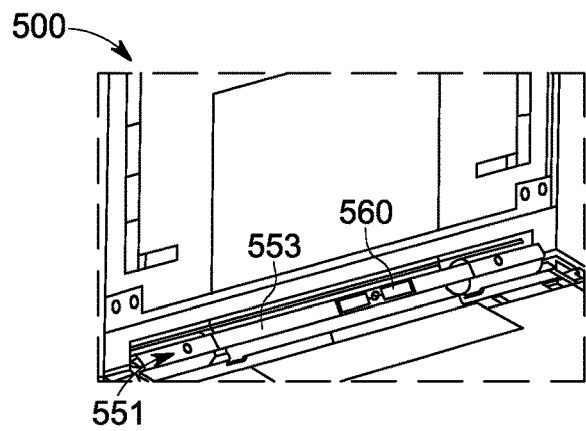
FIG. 5a shows an arrangement of an antenna in a supporting structure of an electronic device in an opening state.

FIG. 5a shows an arrangement of an antenna in a supporting structure of an electronic device in an opening state. The electronic device 500 may be implemented similar to the electronic device described in connection with or one or more examples of FIGS. 1-3. The antenna 560 may be integrated into an inner part 553 of the supporting structure 551. Thus, in the opening state a radiation of the antenna 560 may be improved. For example, a radiation of the antenna may be improved if an opening angle between lid and case may be greater as e.g. 90°, e.g. for tent mode.

More details and aspects are mentioned in connection with the examples described above and/or below. The example shown in FIG. 5a may comprise one or more optional additional features corresponding to one or more aspects mentioned in connection with the proposed concept or one or more examples described above (e.g. FIGS. 1-4b) and/or below (e.g. FIGS. 5b-17).

Figure 5B:
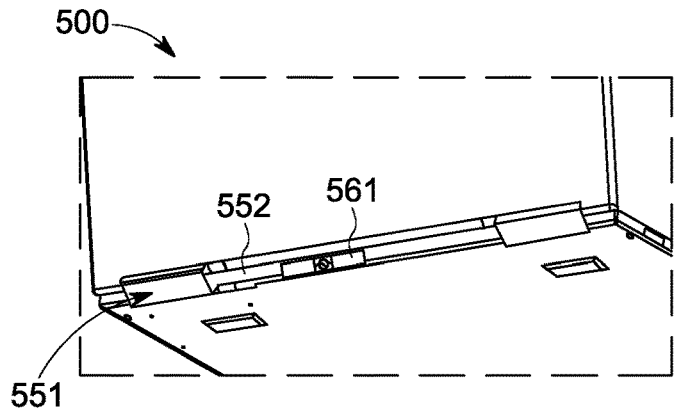
FIG. 5b shows an arrangement of an antenna in a supporting structure of an electronic device in an opening state.

FIG. 5b shows another example of an arrangement of an antenna in a supporting structure of an electronic device in an opening state. The electronic device 500 may be implemented similar to the electronic device described in connection with or one or more examples of FIGS. 1-3. The antenna 561 may be integrated into an outer part 552 of the supporting structure 551. Thus, in the opening state and/or the closed state the antenna 560 may radiate improved.

More details and aspects are mentioned in connection with the examples described above and/or below. The example shown in FIG. 5b may comprise one or more optional additional features corresponding to one or more aspects mentioned in connection with the proposed concept or one or more examples described above (e.g. FIGS. 1-5a) and/or below (e.g. FIGS. 5c-17).

Figure 5C:
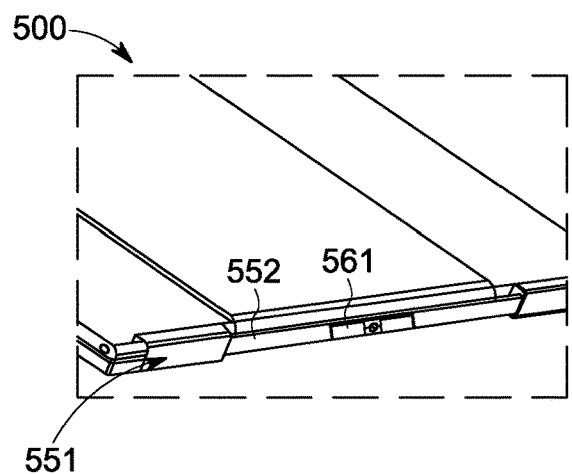
FIG. 5c shows an arrangement of an antenna in a supporting structure of an electronic device in a closed state.

FIG. 5c shows an arrangement of an antenna in a supporting structure of an electronic device in a closed state. The electronic device 500 may be implemented similar to the electronic device described in connection with or one or more examples of FIGS. 1-3. The antenna 561 may be integrated into an outer part 552 of the supporting structure 551. Thus, in the closed state the antenna 561 may radiate improved.

A Hall-effect sensor may be used to determine an opening state of the electronic device. For example, a proximity sensor, an accelerometer or other sensors may be used determine an opening state of the electronic device.

A mobile device may comprise an electronic device as described above.

The FIGS. 5a-5c show the antenna placement into a supporting structure 551, e.g. a D-roller, with heat spreading structure 550, e.g. a graphite sheet, led through the supporting structure 551. A first antenna 560 may be arranged in an inner D-roller 553 and a second antenna 561 may be arranged in an outer D-roller 552. A Hall-effect sensor may provide close lid and open lid use case information to a CPU/Modem, to select one of the antennas 560, 561 based on a use case. Any one of the antennas (arranged back or front of graphite sheet/inner and outer D-roller) can be selected based on the use case scenario, e.g. open lid mode, close lid mode, tablet mode or tent mode.

More details and aspects are mentioned in connection with the examples described above and/or below. The example shown in FIG. 5c may comprise one or more optional additional features corresponding to one or more aspects mentioned in connection with the proposed concept or one or more examples described above (e.g. FIGS. 1-5b) and/or below (e.g. FIGS. 6-17).

Figure 6:
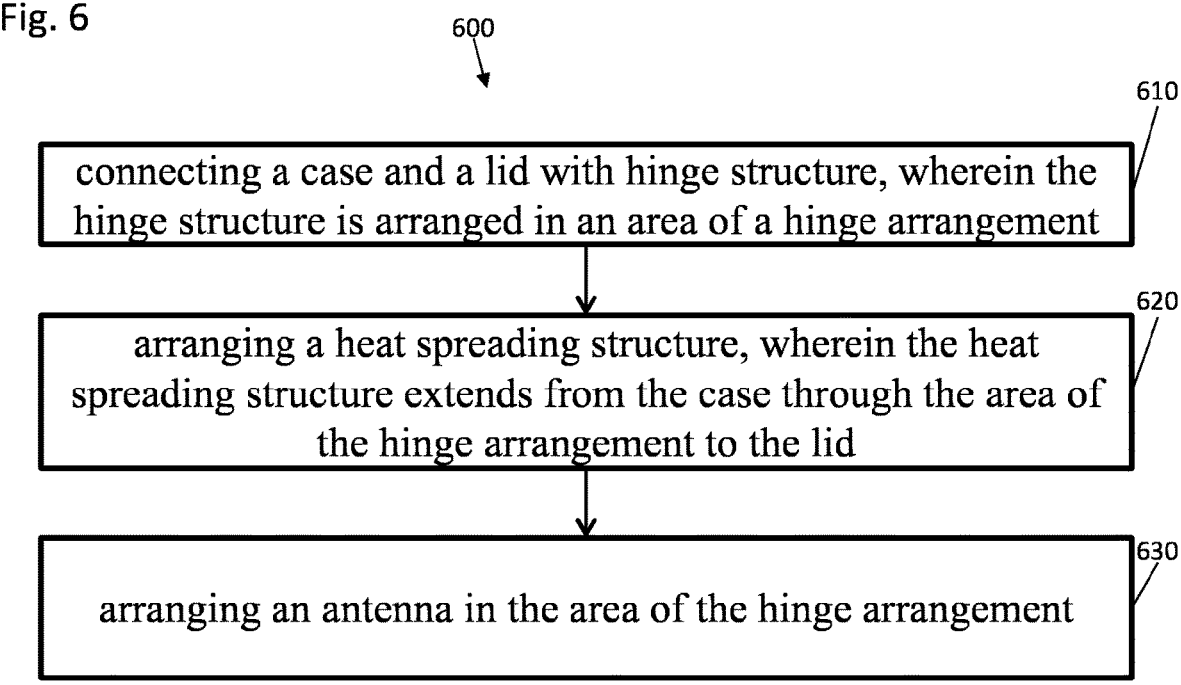
FIG. 6 shows a flow chart of a method for fabricating an electronic device.

FIG. 6 shows a flow chart of a method for fabricating an electronic device. The method 600 may comprise connecting 610 a case and a lid with hinge structure. The hinge structure may be arranged in an area of a hinge arrangement. Further, the method may comprise arranging 620 a heat spreading structure. The heat spreading structure may extend from the case through the area of the hinge arrangement to the lid. Further, the method may comprise arranging 630 an antenna in the area of the hinge arrangement.

More details and aspects are mentioned in connection with the examples described above and/or below. The example shown in FIG. 6 may comprise one or more optional additional features corresponding to one or more aspects mentioned in connection with the proposed concept or one or more examples described above (e.g. FIGS. 1-5c) and/or below (e.g. FIGS. 7-17).

Figure 7:
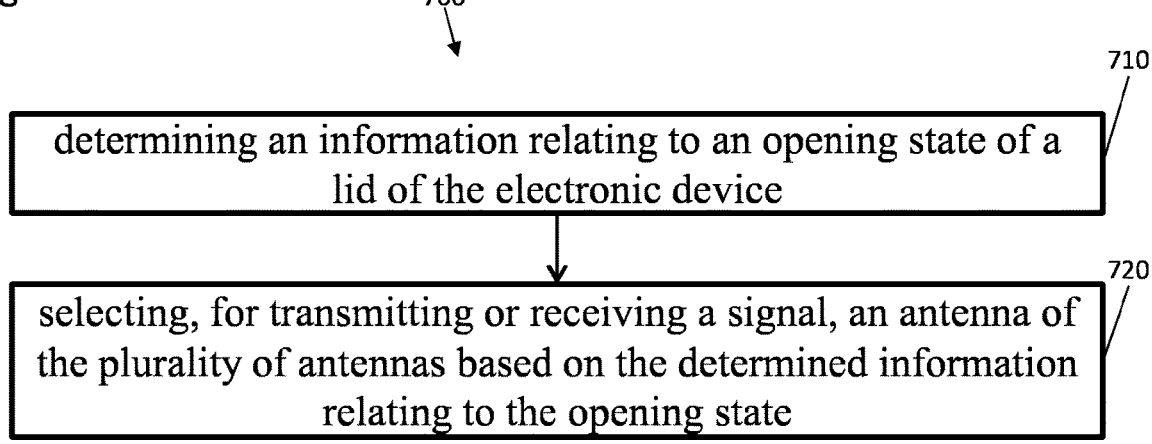
FIG. 7 shows a flow chart of a method for selecting an antenna of a plurality of antennas of an electronic device for transmitting or receiving a signal.

FIG. 7 shows a flow chart of a method for selecting an antenna of a plurality of antennas of an electronic device for transmitting or receiving a signal. The method 700 may comprise determining 710 an information relating to an opening state of a lid of the electronic device. Further, the method 700 may comprise selecting 720, for transmitting or receiving a signal, an antenna of the plurality of antennas based on the determined information relating to the opening state.

By selecting an antenna based on the opening state, an antenna may be selected, which provides better performance than one or more other antennas of the electronic device in the respective opening state. In this way, the transmission performance may be improved.

An opening state may be any possible relative position of a lid to a case, e.g. open lid mode, close lid mode, tablet mode or tent mode. Each of the different opening states may represent an angle range between the lid and the case. The information relating to the opening state may be an angel between the lid and the case or may one of the opening states. For example, the information relating to the opening state may be determined by use of a sensor (e.g. a Hall-effect sensor or an magnetoresistive sensor).

Two antennas of the plurality of antennas may be arranged on different sides of a radiopaque structure. Further, selecting the antenna may be further based on a position of an antenna in respect to the radiopaque structure. The radiopaque structure may be a heat spreading structure, e.g. a graphite sheet. One of each antenna may be arranged and/or integrated into an inner part and an outer part of a supporting structure, respectively. Thus, each antenna may be arranged on a different side of the radiopaque structure. For example, an antenna arranged in the inner part may be selected for radiation if the electronic device may be in an opening state. For example, an antenna arranged in the outer part may be selected for radiation if the electronic device may be in a closed state. Thus, a radiation performance of an electronic device may be improved by a selection of an antenna less influenced by the radiopaque structure.

The method 700 may further comprise determining an opening angle of the lid and selecting the antenna based on the opening angle of the lid. By determine an opening angle an accuracy of a determination of an opening state may be improved. Thus, selecting 720 an antenna may be improved, because a space screened by the radiopaque structure of each antenna may be determined based on the opening angle. For example, an opening angle may be determined by use of a Hall-effect sensor.

The method 700 may further comprise selecting, for transmitting or receiving a signal, a second antenna of the plurality of antennas based on the determined opening angle of the lid. For example, if an opening angle between lid and case may be 180°, two antennas may be selected for radiation, each antenna arranged on a different side of the radiopaque structure. Thus, an entire space around the electronic may be covered a radiation of two antennas.

More details and aspects are mentioned in connection with the examples described above and/or below. The example shown in FIG. 7 may comprise one or more optional additional features corresponding to one or more aspects mentioned in connection with the proposed concept or one or more examples described above (e.g. FIGS. 1-6) and/or below (e.g. FIGS. 8-17).

Figure 8:
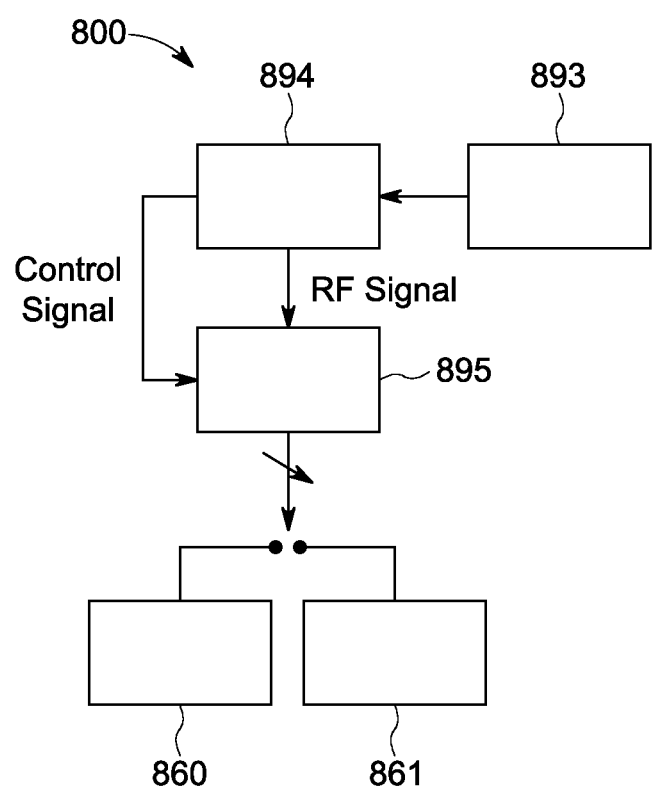
FIG. 8 shows a block diagram of an example of a device for selecting an antenna.

FIG. 8 shows a block diagram of an example of a device for selecting an antenna. The device 800 comprises a sensor 893, a CPU/modem 894, a RF-Switch 895 and two antennas 860, 861. The sensor 893, e.g. a Hall-effect sensor, may determine an opening state of an electronic device and may transmit an information of the opening state to the CPU/modem 894. The CPU/modem may send a controlling signal and/or a RF-signal to an RF-switch 895. The controlling signal and/or the RF-signal may depend on the opening state. The RF-switch 895 may fed the first antenna 860 and/or the second antenna 861 based on the controlling signal and/or the RF-signal.

The method may further comprise feeding a first antenna of the plurality of antennas and a second antenna of the plurality of antennas with a RF-Switch. Further, either the first antenna or the second antenna can be fed separately. Thus, during operation of an electronic device an energy consumption may be reduced, because only one antenna out of two antennas may be active.

FIG. 8 shows an example of an antenna selection model (BAS). The proposed technique may use a Hall-effect sensor and best antenna selection (BAS) feature of a system to achieve a required antenna performance for different use case scenarios. FIG. 8 shows the antenna selection for a use scenario (e.g. close or open lid). The sensor 893 may send information about a use case to a CPU/modem 894. Based on this information, a control signal may be sent to a RF-switch 95 to select antenna 860 and/or antenna 861. When a user may have an electronic device in open lid mode then antenna 860 may be active and in case of close lid mode the antenna 861 may be active. For example, antenna 860 may be arranged in an inner part and antenna 861 in an outer part of a supporting structure.

More details and aspects are mentioned in connection with the examples described above and/or below. The example shown in FIG. 8 may comprise one or more optional additional features corresponding to one or more aspects mentioned in connection with the proposed concept or one or more examples described above (e.g. FIGS. 1-7) and/or below (e.g. FIGS. 9-17).

Figure 9:
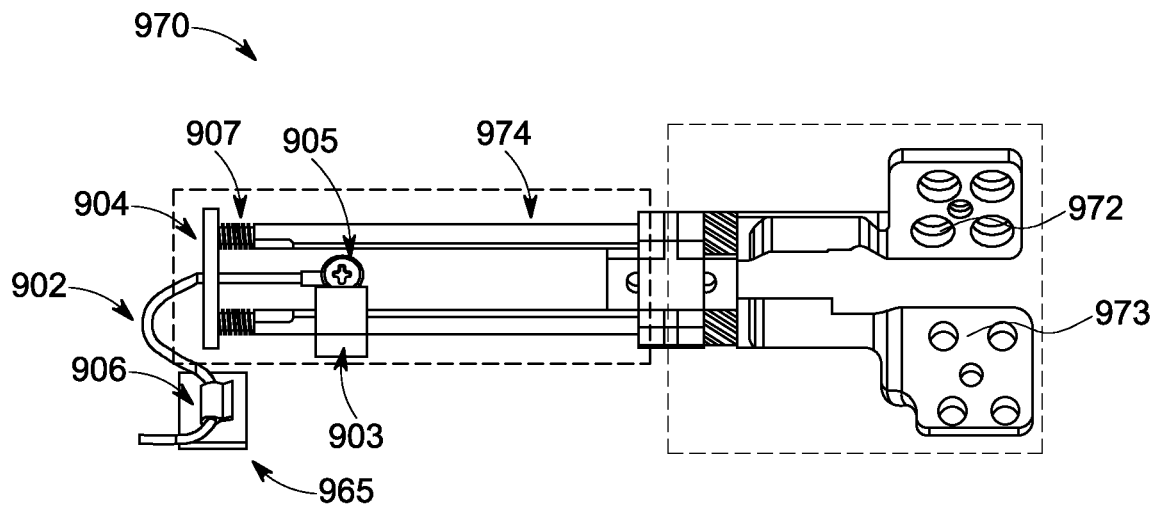
FIG. 9 shows a hinge structure for an electronic device.

FIG. 9 shows a hinge structure for an electronic device. The hinge structure 970 comprises a first fastening element 972 mountable to a case and a second fastening element 973 mountable to a lid. Further the hinge structure comprises a connecting element 974 for pivotable connecting the first fastening element 972 with the second fastening element 972 and a feeding structure 965 to excite the connecting element 974. The connecting element 974 may be used as an antenna. Thus, an assembling of the electronic device may be eased because an extra step for assembling the antenna may be unnecessary.

The connecting element 974 may be designed for Wi-Fi 6E and/or 5G multiple-input and multiple-output (MIMO) operation. For example, a dimension, e.g. a length, of the connecting element 974 may be designed to enable a radiation for Wi-Fi 6E and/or 5G MIMO operation. For example, the connecting element 974 may be a rod antenna with a base. The base of the rod antenna may be used for connecting the first fastening element 972 and the second fastening element 973.

A length of the connecting element 974 may be at least 20 mm and/or at most 40 mm. For example, a length of the connecting element 974 may be at least 20 mm, or at least 25 mm or at least 30 mm and/or at most 40 mm, or at most 35 mm or at most 33 mm.

The feeding structure 965 may comprise a cable 902 and a cable joint 903. Further, the cable joint 903 may be used to attach the cable 902 to the connecting element 974. The cable 902 may be attached by a screw 905 to the cable joint 903. The cable may be attached to the case by a cable clip 906. Thus, a manufacturing of the hinge structure 970 may be eased. Further, there may be no need to lead the cable 902 through an end of the hinge structure 970 mounted to an electronic device, e.g. the fast-fastening element 973. For example, a connection of the connecting element 974 may be eased by connecting the cable with a rod of the connecting element 974.

An inner conductor of the coaxial cable 902 may be attached to the cable joint and an outer conductor of the coaxial cable may be attached to the case or lid. Thus, a grounding of the antenna may be improved by the case or lid.

The hinge structure may further comprise a keep out zone. The keep out zone may have a radius of at least 2.5 mm, or at least 3.5 m or at least 4.5 mm. Thus, an antenna formed by the connecting element 974 of the hinge arrangement may have an improved radiation characteristic, because an excitation of the connecting element may be less disturbed due to the keep out zone.

The connecting element may comprise two rods and a conducting joint 904 to connect the two rods at one end to form a loop structure. Thus, a dipole antenna may be formed by the connecting element 974.

FIG. 9 shows an example of a mandrel antenna on a laptop system. The connecting element 974, e.g. a mandrel, of a hinge structure 970, e.g. a hinge, may be proposed as antenna. The mandrel length may be extended to get required resonance frequency for Wi-Fi 6E and 5G MIMO operation. A RF coaxial cable may be used to feed the mandrel antenna for RF signal radiation. Any required antenna cable routing may not be routed through a hinge structure fastening element, e.g. a bracket. The antenna cable may be routed separately to the base. The solution may not require additional pcb/fpc for antenna, for direct feeding or coupling. The solution may support a hinge operation for 360° rotation (convertible systems).

The Mandrel in the hinge may work as antenna. The Mandrel length may be extended (e.g. to a length of 33 mm) and connected with a metal joint 904, e.g. via a lock thread 907. This may form a loop structure as shown in FIG. 9. A connecting joint 903, e.g. a flange, may be attached to the mandrel to connect a live-wire (inner conductor) of an antenna cable 902. A metal screw 905 may be used to fix a flange 903 and a cable 902 live-wire (inner conductor) end. The antenna cable 902 ground (outer conductor) may be connected to a system chassis, e.g. a case or lid, using a cable clip 906 for a system ground/reference. A hinge cap may be a plastic material. For better bandwidth, return loss and efficiency, the mandrel may have a keep out zone (KOZ) of 2.5 mm or more from any chassis part, e.g. case and/or lid and/or any other part of the electronic device. The proposed antenna may work analog to a folded dipole antenna. The proposed mandrel antenna may be independent of thermal cross spreading (TCS). For example, the performance of the antenna may remain the same with and without TCS, e.g. a graphite sheet. The mandrel antenna may do not require additional space or KOZ. It may give similar performance for all use case scenario (open lid mode, close lid mode, tablet mode or tent mode).

More details and aspects are mentioned in connection with the examples described above and/or below. The example shown in FIG. 9 may comprise one or more optional additional features corresponding to one or more aspects mentioned in connection with the proposed concept or one or more examples described above (e.g. FIGS. 1-8) and/or below (e.g. FIGS. 10-17).

Figure 10:
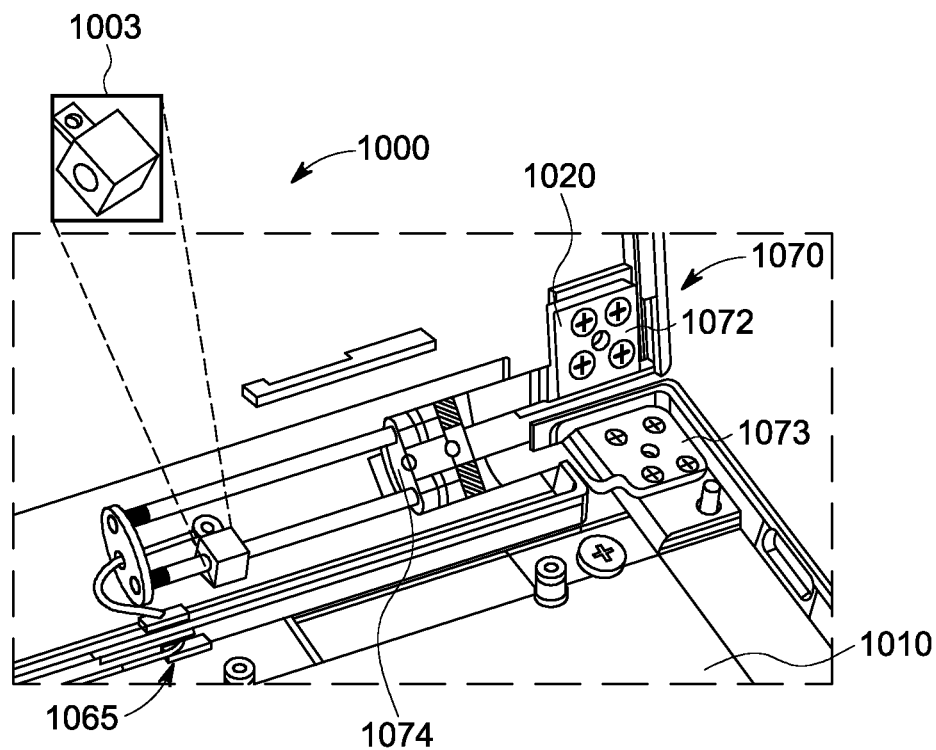
FIG. 10 shows a hinge structure mounted to a case and a lid.

FIG. 10 shows a hinge structure mounted to a case and a lid. The hinge structure 1070 comprises a first fastening element 1072 mountable to a case 1010 and a second fastening element 1073 mountable to a lid 1020 of an electronic device 1000. Further the hinge structure comprises a connecting element 1074 for pivotable connecting the first fastening element 1072 with the second fastening element 1072 and a feeding structure 1075 to excite the connecting element 1074. The connecting element 1074 may be used as an antenna. Thus, a manufacturing of the electronic device may be eased by this antenna because an extra step for assembling the antenna may be unnecessary.

More details and aspects are mentioned in connection with the examples described above and/or below. The example shown in FIG. 10 may comprise one or more optional additional features corresponding to one or more aspects mentioned in connection with the proposed concept or one or more examples described above (e.g. FIGS. 1-9) and/or below (e.g. FIGS. 11-17).

Figure 11A:
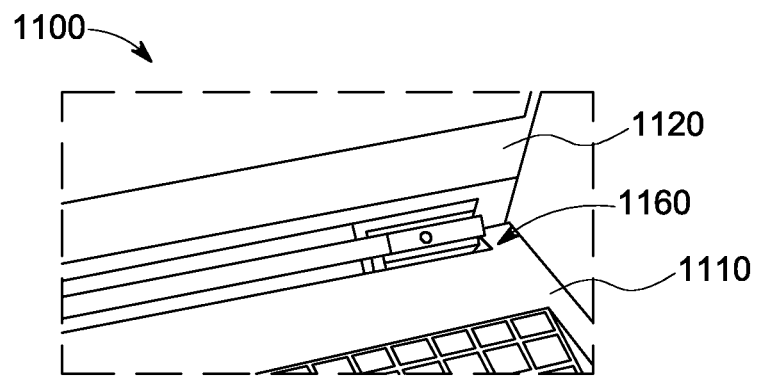
FIG. 11a shows an arrangement of an antenna in an electronic device in open lid state.

FIG. 11a shows an arrangement of an antenna in an electronic device in open lid state. The antenna 1160 may be formed by a connecting element. The connecting element may connect a case 1110 and a lid 1120 of an electronic device 1100.

Figure 11B:
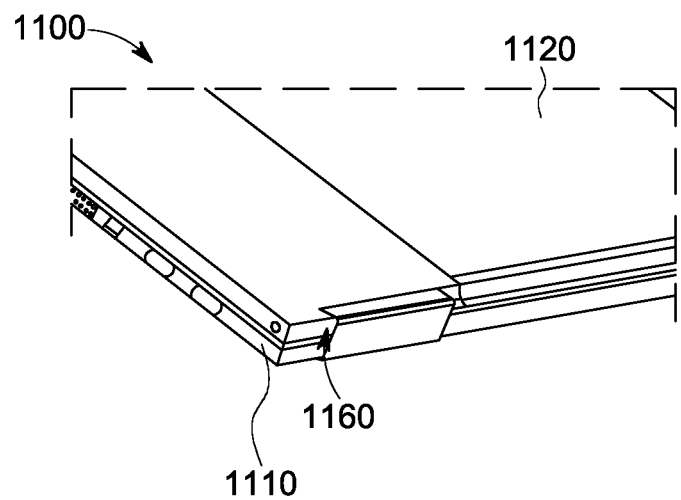
FIG. 11b shows an arrangement of an antenna in an electronic device in closed lid state.

FIG. 11b shows an arrangement of an antenna in an electronic device in closed lid state. The antenna 1160 may be formed by a connecting element. The connecting element may connect a case 1110 and a lid 1120 of an electronic device. Thus, a manufacturing of the electronic device may be eased by this antenna because an extra step for assembling the antenna may be unnecessary. Furthermore, the antenna formed by a connecting element may be used for every opening state of an electronic device, because a radiation from this antenna may be less influenced by a heat spreading structure and/or an opening state/opening angle of the electronic device.

FIGS. 11a and 11b show an example of an antenna location in open lid and close lid use cases.

More details and aspects are mentioned in connection with the examples described above and/or below. The example shown in FIG. 11b may comprise one or more optional additional features corresponding to one or more aspects mentioned in connection with the proposed concept or one or more examples described above (e.g. FIGS. 1-11a) and/or below (e.g. FIGS. 12-17).

Figure 12A:
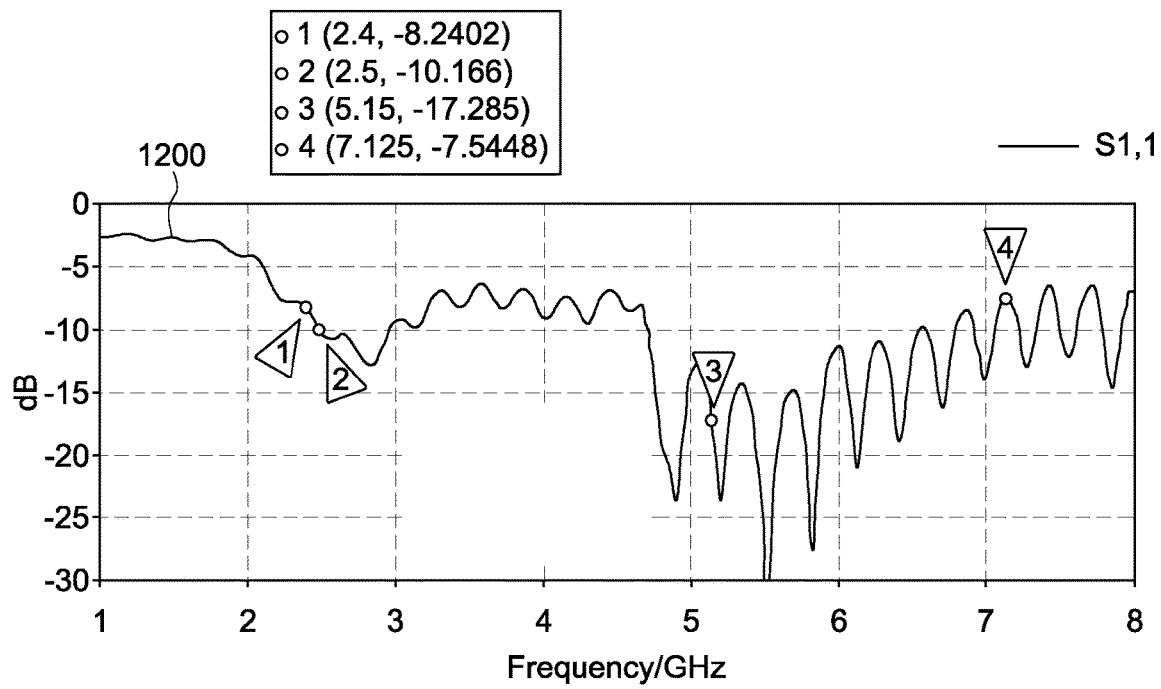
FIGS. 12a and 12b show simulations of a magnitude of a S11-parameter in Db (FIG. 12a)) and a total efficiency (FIG. 12b)) as a function of the frequency for an antenna integrated into a heat spreading structure.
Figure 12B:
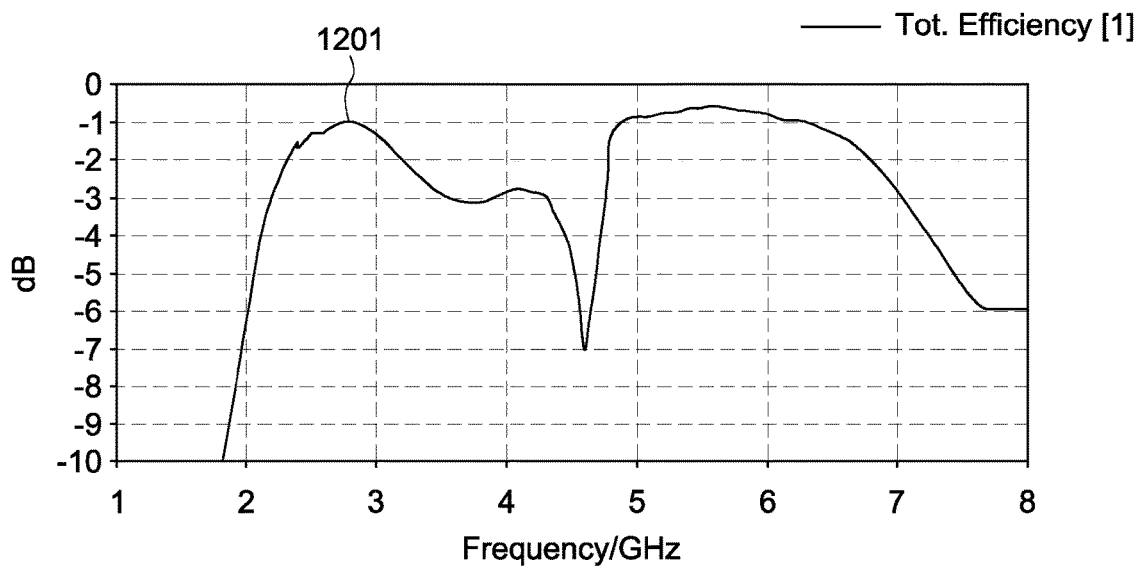

FIG. 12 shows simulations of a magnitude of a S11-parameter in Db (FIG. 12a) and a total efficiency (FIG. 12b) as a function of the frequency for an antenna integrated into a heat spreading structure. FIG. 12a shows an example of a graphite sheet antenna—antenna integrated into an opening of a heat spreading structure or formed on a surface of a heat spreading structure—return loss, S11.paramater 1200 in dB. The simulated return loss of a graphite sheet antenna is shown in FIG. 12. The result shows that the antenna may give a wideband response. The return loss may be below −6 dB for Wi-Fi 6E frequencies (2.4-2.5 GHz and 5.5-7.125 GHz) and 5G MIMO frequencies (1.8-2.7 GHz and 3.3-5 GHz).

FIG. 12b shows an example of a graphite sheet antenna total efficiency 1210 in dB. The total efficiency 1210 may be above −3 dB for a wide frequency band. Thus, the proposed graphite sheet antenna as described above may be used for Wi-Fi 6E frequencies (2.4-2.5 GHz and 5.5-7.125 GHz) and 5G MIMO frequencies (1.8-2.7 GHz and 3.3-5 GHz).

More details and aspects are mentioned in connection with the examples described above and/or below. The example shown in FIG. 12 may comprise one or more optional additional features corresponding to one or more aspects mentioned in connection with the proposed concept or one or more examples described above (e.g. FIGS. 1-11) and/or below (e.g. FIGS. 13-17).

Figure 13A:
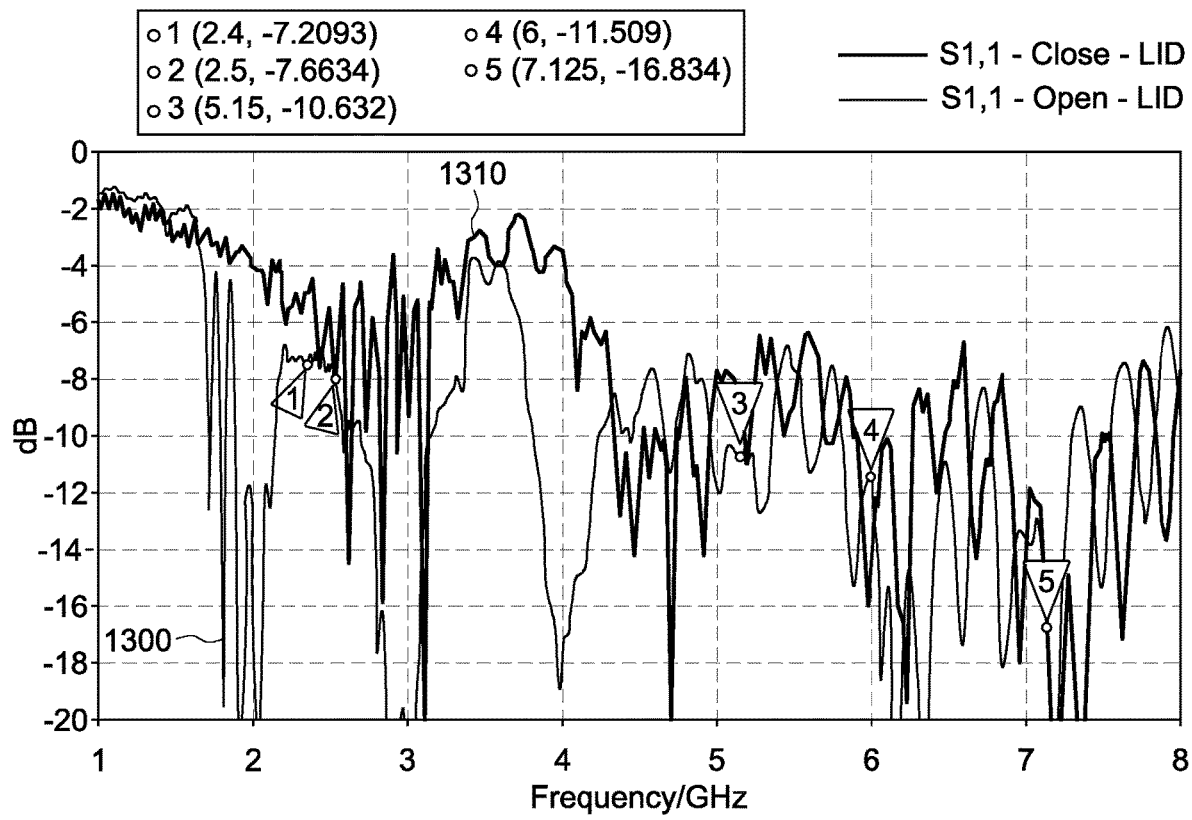
FIGS. 13a and 13b show simulations of a magnitude of a S11-parameter in Db (FIG. 13a) and a total efficiency (FIG. 13b) as a function of the frequency for an antenna integrated into a hinge structure.
Figure 13B:
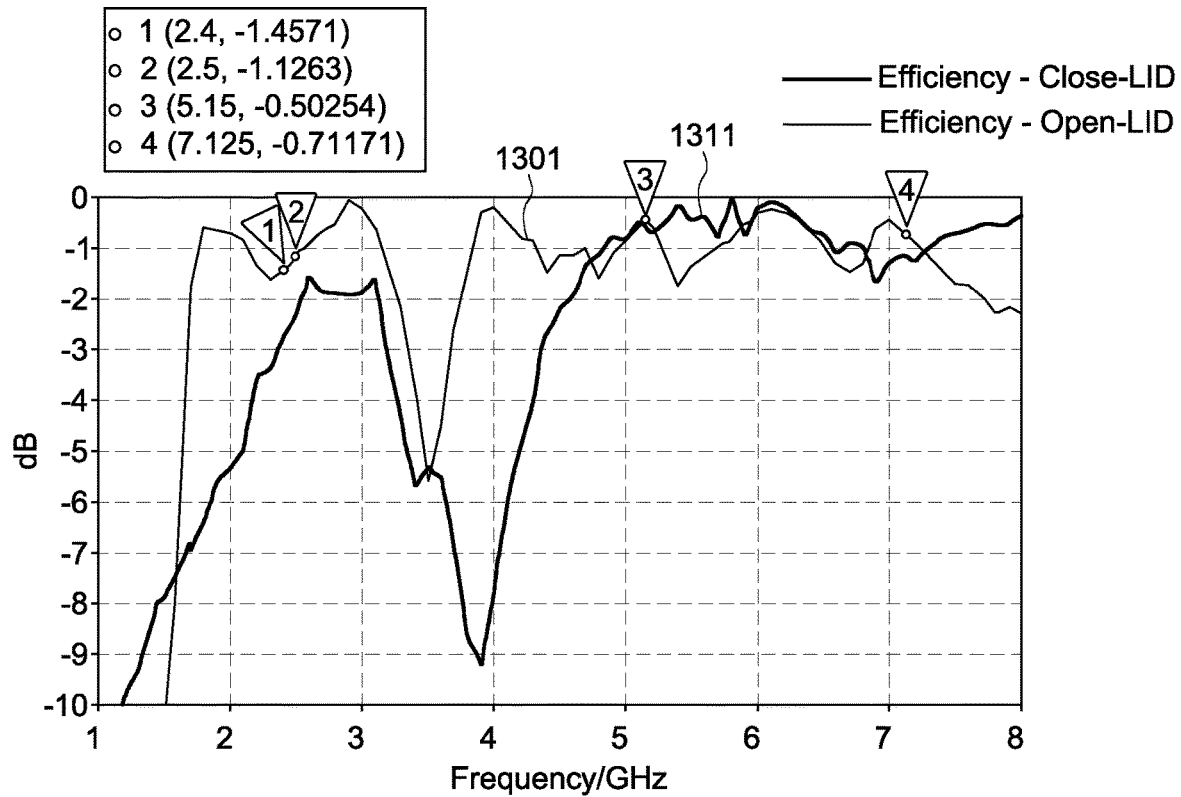

FIG. 13 shows simulations of a magnitude of a S11-parameter in Db (FIG. 13a) and a total efficiency (FIG. 13b) as a function of the frequency for an antenna integrated into a hinge structure. FIG. 13a shows an example of a mandrel antenna—antenna integrated into a hinge structure—return loss, S11 in dB for an open lid state 1300 and a clos lid state 1310 use cases.

The simulated return loss and efficiency data show that the proposed mandrel antenna gives a wideband response. The operating bands cover 5G MIMO frequency bands (1.8-2.7 GHz and 3.3-5 GHz) and Wi-Fi 6E frequency bands (2.4-2.5 GHz, 5.15-5.85 GHz and 5.95-7.125 GHz). The return loss may be for open lid 1300 below −6 dB for operating bands. The return loss may be for closed lid 1300 below −8 dB for operating bands.

FIG. 13b shows an example of a mandrel antenna total efficiency in dB in open lid 1301 and clos lid 1311 use cases. The total efficiency for open lid 1301 may be above −2 dB for a wide frequency band. The total efficiency for closed lid 1311 may be above −3 dB for a wide frequency band. Thus, the proposed mandrel antenna as described above may be used for Wi-Fi 6E frequencies (2.4-2.5 GHz and 5.5-7.125 GHz) and 5G MIMO frequencies (1.8-2.7 GHz and 3.3-5 GHz).

More details and aspects are mentioned in connection with the examples described above. The example shown in FIG. 13 may comprise one or more optional additional features corresponding to one or more aspects mentioned in connection with the proposed concept or one or more examples described above (e.g. FIGS. 1-12) and/or below (e.g. FIGS. 14-17).

Some embodiments relate to antennas design method and implementation technology in thermal cross spreading system. Most of the antenna may work with laptop mode (open lid/clamshell), if arranged on lid or case, but performance (efficiency) may drop in close lid mode, tablet mode, tent mode and other use case scenario, which causes a drop in throughput of wireless. Achieving antenna performance may be also in narrow bezel and thin system design challenging.

Above an antenna design and placement solutions is described, which can utilize a thermal cross spreading area. The proposed solution may help to meet all the antenna required performance and coexistence with graphite sheet/thermal cross spread.

Recent development in passive cooling systems utilize a heat spreading structure, e.g. a graphite sheet, used as thermal cross spreading between case (D-cover) and lid (A-cover). A plastic barrel (e.g. supporting structure) may be divided in two parts to support the graphite sheet, e.g. a deformation. The barrel divided parts may have a D-shape to support a deformation, e.g. a bending, of the graphite sheet. An antenna placement described above may be on a front and a back side of the graphite sheet (TCS) integrated in a plastic D-roller and optionally with enabled Best Antenna Selection (BAS) feature. The BAS feature may be used to switch between the antennas based on its performance and use case scenario. A Hall-effect sensor, a proximity sensor, accelerometer or other sensors may give information about a close/open lid and other use case information to CPU/Modem, to select one of the antennas for BAS feature. Thus, the antenna may give a high gain (directionality increases) with backed graphite sheet.

Another proposal may be that a partial area of a graphite sheet itself may be proposed as antenna. A slot antenna or an antenna pattern may be made in a graphite sheet to get a desired resonance frequency band. The slot antenna or antenna pattern may be excited by another feed trace or coaxial cable. The antenna area on a graphite sheet near a barrel (e.g. a hinge structure) may be metal painted to increase the conductivity or stick conductive fpc and a rest of the graphite material may be used to increase a grounding for the antenna. The gap between lid and base (e.g. case), may provide RF window and may allow radiation. The solution may not affect the thermal performance of the system. The graphite sheet connection with A-cover (e.g. lid) and D-cover (e.g. case) may provide a bigger ground plane for antenna that will improve the antenna performance.

Another proposal may be the use of a hinge mandrel as antenna in a convertible system. Here the mandrel may be proposed as antenna (radiator). The mandrel may be directly fed with coaxial cable and its length may be extended to get resonance at desired frequency band. The mandrel antenna performance may be independent to TCS. The mandrel antenna may not require additional space or KOZ. This antenna may not require additional pcb/fpc for antenna for direct feeding or coupling. The proposed antenna may support a hinge operation for 360° rotation (e.g. for convertible systems). The mandrel antenna may give similar performance for all use case scenario (e.g. open lid mode, close lid mode, tablet mode, tent mode). The mandrel antenna performance may be independent to TCS.

Figure 14:
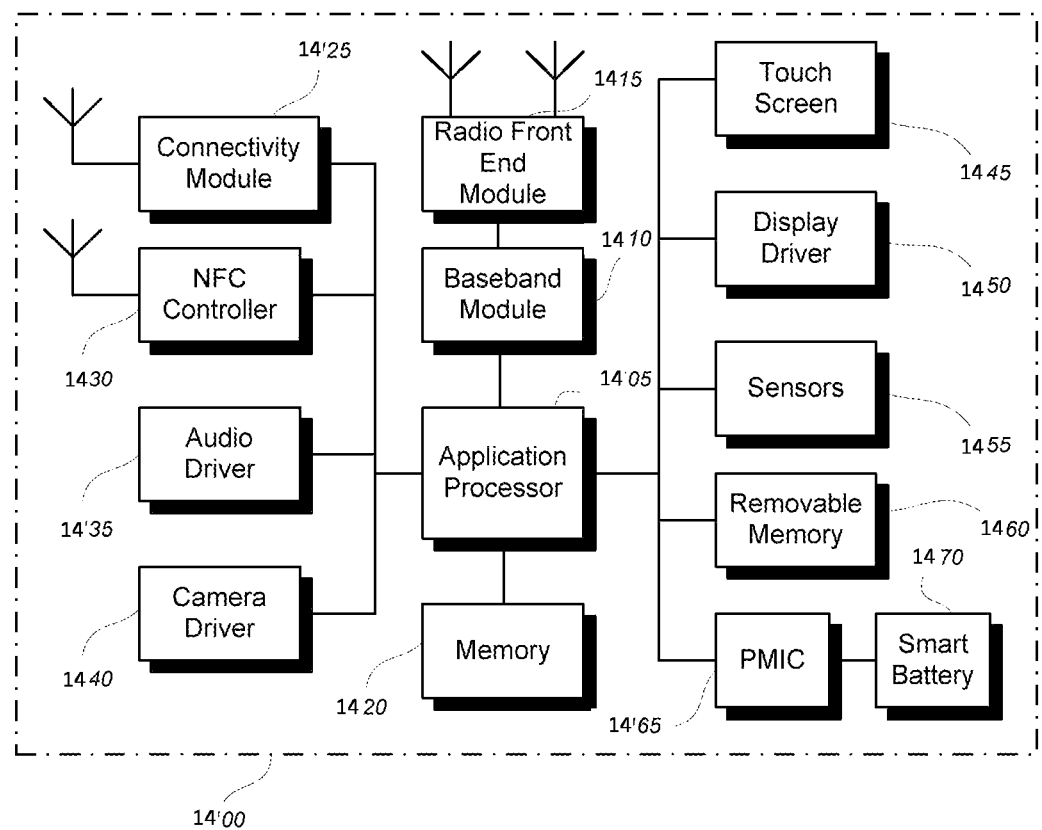
FIG. 14 illustrates a user device in accordance with an aspect.

FIG. 14 illustrates a user device 1400 in accordance with an aspect. The user device 1400 may be a mobile device in some aspects and includes an application processor 1405, baseband processor 1410 (also referred to as a baseband module), radio front end module (RFEM) 1415, memory 1420, connectivity module 1425, near field communication (NFC) controller 1430, audio driver 1435, camera driver 1440, touch screen 1445, display driver 1450, sensors 1455, removable memory 1460, power management integrated circuit (PMIC) 1465 and smart battery 1470. An application processor 1405 may be arranged in a proximity of a heat spreading structure. For example, the application processor 1405 may be a heat source, e.g. in a first region. Thus, the heat spreading may improve a thermal solution by transfer heat from the application region to another region without heat source in an electronic device.

In some aspects, application processor 1405 may include, for example, one or more CPU cores and one or more of cache memory, low drop-out voltage regulators (LDOs), interrupt controllers, serial interfaces such as serial peripheral interface (SPI), inter-integrated circuit (I2C) or universal programmable serial interface module, real time clock (RTC), timer-counters including interval and watchdog timers, general purpose input-output (TO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 1410 may be implemented, for example, as a solder-down substrate including one or more integrated circuits, a single packaged integrated circuit soldered to a main circuit board, and/or a multi-chip module containing two or more integrated circuits.

Figure 15A:
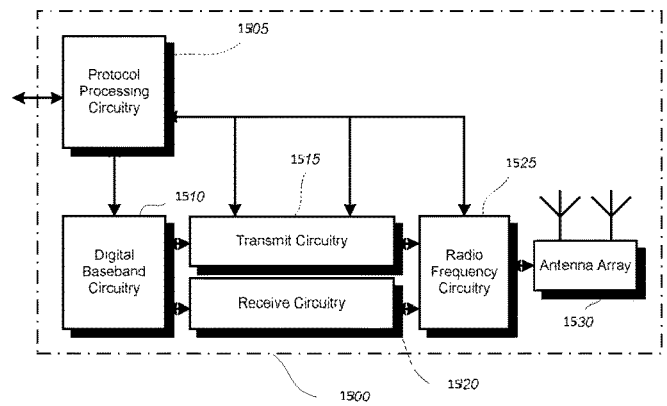
FIG. 15a illustrates an exemplary millimeter wave communication circuitry 1500 according to some aspects.

FIG. 15*a* illustrates an exemplary millimeter wave communication circuitry 1500 according to some aspects. Circuitry 1500 is alternatively grouped according to functions. Components as shown in 1500 are shown here for illustrative purposes and may include other components not shown here in FIG. 15*a*.

Millimeter wave communication circuitry 1500 may include protocol processing circuitry 1505, which may implement one or more of medium access control (MAC), radio link control (RLC), packet data convergence protocol (PDCP), radio resource control (RRC) and non-access stratum (NAS) functions. Protocol processing circuitry 1505 may include one or more processing cores (not shown) to execute instructions and one or more memory structures (not shown) to store program and data information.

Millimeter wave communication circuitry 1500 may further include digital baseband circuitry 1510, which may implement physical layer (PHY) functions including one or more of hybrid automatic repeat request (HARD) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 1500 may further include transmit circuitry 1515, receive circuitry 1520 and/or antenna array circuitry 1530.

Millimeter wave communication circuitry 1500 may further include radio frequency (RF) circuitry 1525. In an aspect of the invention, RF circuitry 1525 may include multiple parallel RF chains for one or more of transmit or receive functions, each connected to one or more antennas of the antenna array 1530.

In an aspect of the disclosure, protocol processing circuitry 1505 may include one or more instances of control circuitry (not shown) to provide control functions for one or more of digital baseband circuitry 1510, transmit circuitry 1515, receive circuitry 1520, and/or radio frequency circuitry 1525.

Figure 15B:
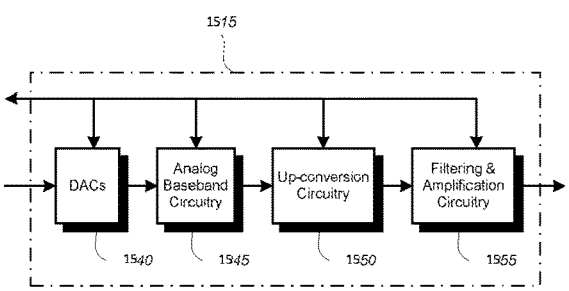
FIGS. 15b and 15c illustrate examples for transmit circuitry in FIG. 15a in some aspects.
Figure 15C:
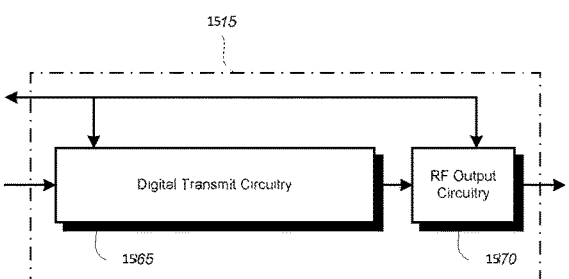

FIGS. 15*b* and 15*c* illustrate examples for transmit circuitry 1515 in FIG. 15*a* in some aspects.

The exemplary transmit circuitry 1515 of FIG. 15*b* may include one or more of digital to analog converters (DACs) 1540, analog baseband circuitry 1545, up-conversion circuitry 1550 and filtering and amplification circuitry 1555. In another aspect, FIG. 15*c* illustrates an exemplary transmit circuitry 1515 which includes digital transmit circuitry 1565 and output circuitry 1570.

Figure 15D:
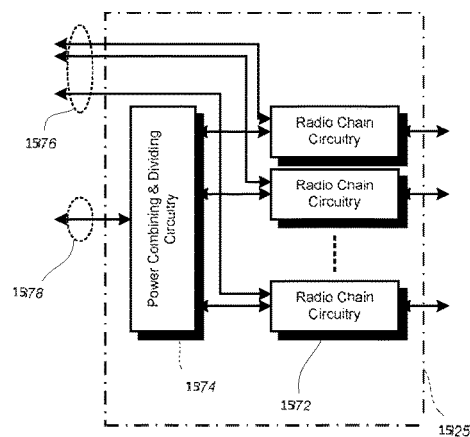
FIG. 15d illustrates an exemplary radio frequency circuitry 1525 in FIG. 15a according to some aspects.

FIG. 15*d* illustrates an exemplary radio frequency circuitry 1525 in FIG. 15*a* according to some aspects.

Radio frequency circuitry 1525 may include one or more instances of radio chain circuitry 1572, which in some aspects may include one or more filters, power amplifiers, low noise amplifiers, programmable phase shifters and power supplies (not shown).

Radio frequency circuitry 1525 may include power combining and dividing circuitry 1574 in some aspects. In some aspects, power combining and dividing circuitry 1574 may operate bidirectionally, such that the same physical circuitry may be configured to operate as a power divider when the device is transmitting, and as a power combiner when the device is receiving. In some aspects, power combining and dividing circuitry 1574 may one or more include wholly or partially separate circuitries to perform power dividing when the device is transmitting and power combining when the device is receiving. In some aspects, power combining and dividing circuitry 1574 may include passive circuitry comprising one or more two-way power divider/combiners arranged in a tree. In some aspects, power combining and dividing circuitry 1574 may include active circuitry comprising amplifier circuits.

In some aspects, radio frequency circuitry 1525 may connect to transmit circuitry 1515 and receive circuitry 1520 in FIG. 15*a* via one or more radio chain interfaces 1576 or a combined radio chain interface 1578.

In some aspects, one or more radio chain interfaces 1576 may provide one or more interfaces to one or more receive or transmit signals, each associated with a single antenna structure which may comprise one or more antennas.

In some aspects, the combined radio chain interface 1578 may provide a single interface to one or more receive or transmit signals, each associated with a group of antenna structures comprising one or more antennas.

Figure 15E:
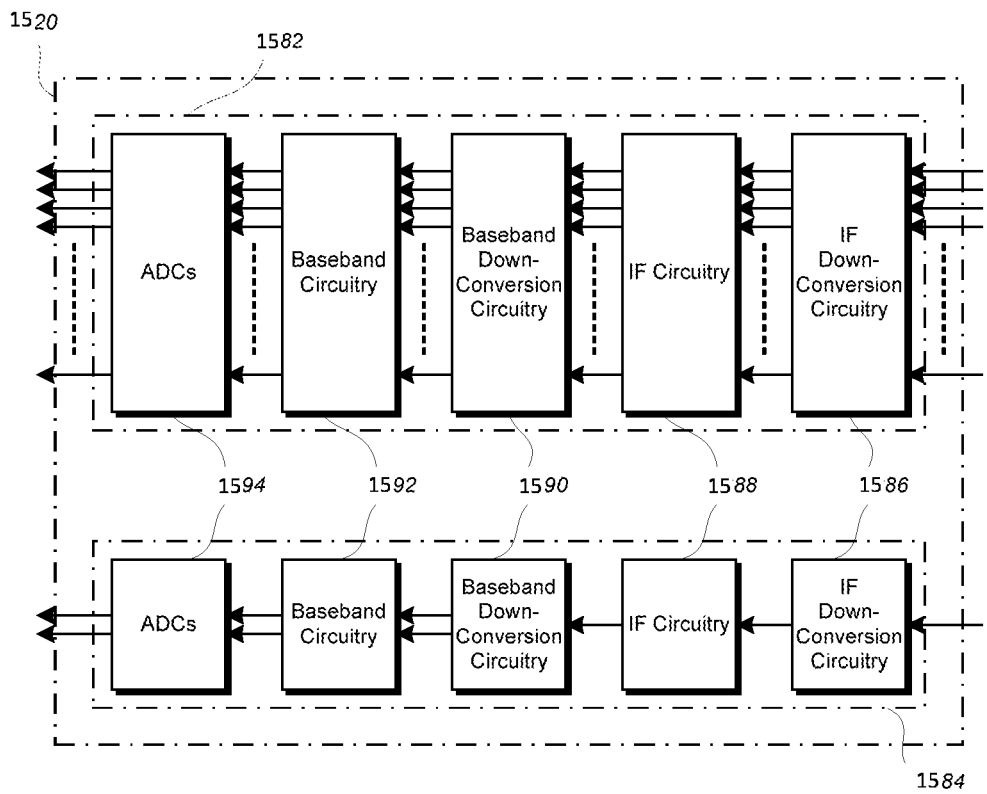
FIG. 15e illustrates exemplary receive circuitry 1520 in FIG. 15a according to some aspects.

FIG. 15*e* illustrates exemplary receive circuitry 1520 in FIG. 15*a* according to some aspects. Receive circuitry 1520 may include one or more of parallel receive circuitry 1582 and/or one or more of combined receive circuitry 1584.

In some aspects, the one or more parallel receive circuitry 1582 and one or more combined receive circuitry 1584 may include one or more Intermediate Frequency (IF) down-conversion circuitry 1586, IF processing circuitry 1588, baseband down-conversion circuitry 1590, baseband processing circuitry 1592 and analog-to-digital converter (ADC) circuitry 1594.

Figure 16:
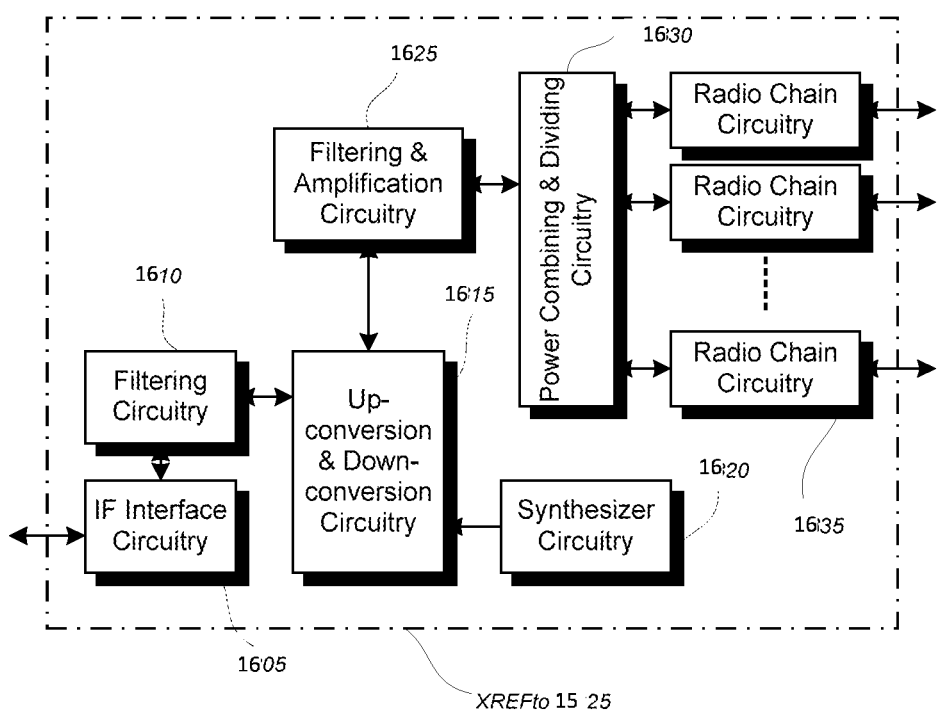
FIG. 16 illustrates RF circuitry XREFto1525 according to some aspects.

FIG. 16 illustrates RF circuitry XREFto3325 according to some aspects.

In an aspect, RF circuitry XREFto3325 may include one or more of each of IF interface circuitry 1605, filtering circuitry 1610, upconversion and downconversion circuitry 1615, synthesizer circuitry 1620, filtering and amplification circuitry 1625, power combining and dividing circuitry 1630 and radio chain circuitry 1635.

Figure 17:
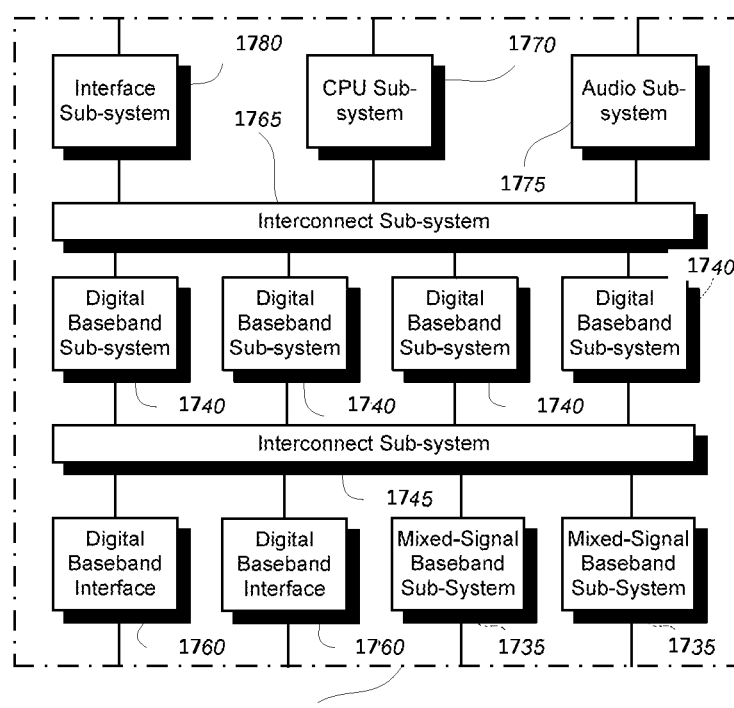
FIG. 17 illustrates a multi-protocol baseband processor in an aspect.

FIG. 17 illustrates a multi-protocol baseband processor 1700 in an aspect.

In an aspect, baseband processor may contain one or more digital baseband systems 1740.

In an aspect, the one or more digital baseband subsystems 1740 may be coupled via interconnect subsystem 1765 to one or more of CPU subsystem 1770, audio subsystem 1775 and interface subsystem 1780.

In an aspect, the one or more digital baseband subsystems 1740 may be coupled via interconnect subsystem 1745 to one or more of each of digital baseband interface 1760 and mixed-signal baseband sub-system 1735.

In an aspect, interconnect subsystem 1765 and 1745 may each include one or more of each of buses point-to-point connections and network-on-chip (NOC) structures.

In an aspect, audio sub-system 1775 may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters.

In an aspect, boot loader sub-system 1910 may include digital logic circuitry configured to perform configuration of the program memory and running state associated with each of the one or more DSP sub-systems 1905. Configuration of the program memory of each of the one or more DSP sub-systems 1905 may include loading executable program code from storage external to baseband processing subsystem (3700 cross reference). Configuration of the running state associated with each of the one or more DSP sub-systems 1905 may include one or more of the steps of: setting the state of at least one DSP core which may be incorporated into each of the one or more DSP sub-systems to a state in which it is not running, and setting the state of at least one DSP core which may be incorporated into each of the one or more DSP sub-systems into a state in which it begins executing program code starting from a predefined memory location.

In an aspect, shared memory sub-system 1915 may include one or more of read-only memory (ROM), static random-access memory (SRAM), embedded dynamic random-access memory (eDRAM) and non-volatile random-access memory (NVRAM).

In an aspect, digital I/O subsystem 1920 may include one or more of serial interfaces such as I2C, SPI or other 1, 2 or 3-wire serial interfaces, parallel interfaces such as general-purpose input-output (GPIO), register access interfaces and direct memory access (DMA). In an aspect, a register access interface implemented in digital I/O subsystem 1920 may permit a microprocessor core external to baseband processing subsystem (3700 cross reference) to read and/or write one or more of control and data registers and memory. In an aspect, DMA logic circuitry implemented in digital I/O subsystem 1920 may permit transfer of contiguous blocks of data between memory locations including memory locations internal and external to baseband processing subsystem (3700 cross reference).

In an aspect, digital baseband interface sub-system 1925 may provide for the transfer of digital baseband samples between baseband processing subsystem (3700 cross reference) and mixed signal baseband or radio-frequency circuitry external to baseband processing subsystem (3700 cross reference). In an aspect, digital baseband samples transferred by digital baseband interface sub-system 1925 may include in-phase and quadrature (I/Q) samples.

In an aspect, controller sub-system 1940 may include one or more of each of control and status registers and control state machines. In an aspect, control and status registers may be accessed via a register interface and may provide for one or more of: starting and stopping operation of control state machines, resetting control state machines to a default state, configuring optional processing features, configuring the generation of interrupts and reporting the status of operations. In an aspect, each of the one or more control state machines may control the sequence of operation of each of the one or more accelerator sub-systems 1945.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

Example 1 is an electronic device comprising a case, a lid, a heat spreading structure, a hinge arrangement between the case and the lid, wherein the hinge arrangement comprises at least one hinge structure connecting the lid to the case and an antenna, wherein the antenna is arranged in an area of the hinge arrangement, and wherein the heat spreading structure extends from the case through the area of the hinge arrangement to the lid.

Example 2 is the electronic device according to example 1, wherein the antenna is integrated into an opening of the heat spreading structure or formed on a surface of the heat spreading structure.

Example is the electronic device according to any one of the preceding examples, wherein the antenna is arranged in an edge region of the heat spreading structure or in a center region of the heat spreading structure.

Example 4 is the electronic device according to any one of the preceding examples, wherein the hinge arrangement further comprises a supporting structure, which supports a deformation of the heat spreading structure during a relative movement of the lid to the case.

Example 5 is the electronic device according to example 4, wherein the antenna is integrated into the supporting structure.

Example 6 is the electronic device according to any of the preceding examples, wherein the supporting structure extends along a first side and along a second side of the heat spreading structure.

Example 7 is the electronic device according to any one of the preceding examples, further comprising a second antenna, wherein the antenna is arranged on a first side of the heat spreading structure and the second antenna is arranged on a second side of the heat spreading structure.

Example 8 is the electronic device according to any of the preceding examples, wherein the heat spreading structure is made in one piece.

Example 9 is the electronic device according to any of the preceding examples, wherein the heat spreading structure transfers heat from a first region of the electronic device to a second region of the electronic device.

Example 10 is the electronic device according to any of the preceding examples, wherein the heat spreading structure has a sheet structure.

Example 11 is the electronic device according to any of the preceding examples, wherein the heat spreading structure is made of graphite or metal.

Example 12 is the electronic device according to any of the preceding examples, wherein the area of the hinge arrangement is limited by a hinge structure each at two opposite sides and wherein the heat spreading structure extends between the two hinge structures through the area of the hinge arrangement.

Example 13 is the electronic device according to any of the preceding examples, wherein a thickness of the heat spreading structure is less than 1 mm.

Example 14 is the electronic device according to any of the preceding examples, wherein the heat spreading structures extends from a backside of the case to a backside of the lid.

Example 15 is the electronic device according to any of the preceding examples, wherein the heat spreading structure extends from a region with a heat source in the case to the lid.

Example 16 is the electronic device according to any of the preceding examples, wherein the antenna is a patch antenna.

Example 16 is the electronic device according to any of the preceding examples, wherein the antenna has a surface area of at most 900 mm$^2$.

Example 17 is the electronic device according to any of the preceding examples, wherein the antenna has a surface area of at most 225 mm$^2$.

Example 18 is a mobile device comprising an electronic device according to any of the preceding examples.

Example 19 is a method for fabricating an electronic device, comprising connecting a case and a lid with hinge structure, wherein the hinge structure is arranged in an area of a hinge arrangement, arranging a heat spreading structure, wherein the heat spreading structure extends from the case through the area of the hinge arrangement to the lid and arranging an antenna in the area of the hinge arrangement.

Example 21 is a method for selecting an antenna of a plurality of antennas of an electronic device for transmitting or receiving a signal, comprising, determining an information relating to an opening state of a lid of the electronic device and selecting, for transmitting or receiving a signal, an antenna of the plurality of antennas based on the determined information relating to the opening state.

Example 22 is the method according to example 21, wherein two antennas of the plurality of antennas are arranged on different sides of a radiopaque structure and wherein selecting the antenna is further based on a position of an antenna in respect to the radiopaque structure.

Example 23 is the method according to any one of examples 21-22, further comprising determining an opening angle of the lid and selecting the antenna based on the opening angle of the lid.

Example 24 is the method according to any one of examples 21-23, further comprising selecting, for transmitting or receiving a signal, a second antenna of the plurality of antennas based on the determined opening angle of the lid.

Example 25 is the method according to any one of examples 21-24, further comprising feeding a first antenna of the plurality of antennas and a second antenna of the plurality of antennas with a RF-Switch, wherein either the first antenna or the second antenna is fed separately.

Example 26 is a hinge structure for an electronic device comprising a first fastening element mountable to a case, a second fastening element mountable to a lid, a connecting element for pivotable connecting the first fastening element with the second fastening element and a feeding structure to excite the connecting element.

Example 27 is the hinge structure according to example 26, wherein the connecting element is designed for Wi-Fi 6E and/or 5G multiple-input and multiple-output operation.

Example 28 is the hinge structure according to any one of examples 26-27, wherein the feeding structure comprises a cable and a cable joint, wherein the cable joint is used to attach the cable to the connecting element.

Example 29 is the hinge structure according to any one of examples 26-28, wherein the cable is a coaxial cable.

Example 30 is the hinge structure according to example 29, wherein an inner conductor of the coaxial cable is attached to the cable joint and an outer conductor of the coaxial cable is attached to the case or lid.

Example 31 is the hinge structure according to any one of examples 26-30, further comprising a keep out zone, wherein this has a radius of at least 2.5 mm.

Example 32 is the hinge structure according to any one of examples 26-31, wherein a length of the connecting element is at least 19 mm and at most 40 mm.

Example 33 is the hinge structure according to any one of examples 26-32, wherein the connecting element comprises two rods and a conducting joint to connect the two rods at one end to form a loop structure.

The following examples are hereby incorporated in the detailed description, wherein each example may stand on its own as a separate example. It should also be noted that although in the examples a dependent example refers to a particular combination with one or more other examples, other examples may also include a combination of the dependent example with the subject matter of any other dependent or independent example. Such combinations are hereby explicitly proposed, unless it is stated in the individual case that a particular combination is not intended. Furthermore, features of an example should also be included for any other independent example, even if that example is not directly defined as dependent on that other independent example.

What is claimed is:

1. An electronic device comprising:
   a case;
   a lid;
   a heat spreading structure;
   a hinge arrangement between the case and the lid, wherein the hinge arrangement comprises an at least one hinge structure connecting the lid to the case;
   an antenna, wherein the antenna is arranged in an area of the hinge arrangement on a first side of the heat spreading structure; and
   a second antenna, wherein the second antenna is arranged on a second side of the heat spreading structure, and wherein the heat spreading structure extends from the case through the area of the hinge arrangement to the lid.

2. The electronic device according to claim 1, wherein the antenna is integrated into an opening of the heat spreading structure or formed on a surface of the heat spreading structure.

3. The electronic device according to claim 1, wherein the antenna is arranged in an edge region of the heat spreading structure or in a center region of the heat spreading structure.

4. The electronic device according to claim 1, wherein the hinge arrangement further comprises a supporting structure, which supports a deformation of the heat spreading structure during a relative movement of the lid to the case.

5. The electronic device according to claim 4, wherein the antenna is integrated into the supporting structure.

6. The electronic device according to claim 1, wherein the heat spreading structure is made of graphite or metal.

7. The electronic device according to claim 1, wherein the area of the hinge arrangement is limited by two hinge structures, wherein each of the two hinge structures are arranged at opposite sides of the hinge arrangement and wherein the heat spreading structure extends between the two hinge structures through the area of the hinge arrangement.

8. The electronic device according to claim 1, wherein a thickness of the heat spreading structure is less than 1 mm.

9. The electronic device according to claim 1, wherein the antenna is a patch antenna.

10. A method for fabricating an electronic device, according to claim 1 comprising:
    connecting the case and the lid with the at least one hinge structure, wherein the hinge structure is arranged in the area of a hinge arrangement;
    arranging the heat spreading structure, wherein the heat spreading structure extends from the case through the area of the hinge arrangement to the lid;
    arranging the antenna in the area of the hinge arrangement on a first side of the heat spreading structure; and
    arranging the second antenna on a second side of the heat spreading structure.

11. A method for selecting an antenna of a plurality of antennas of an electronic device for transmitting or receiving a signal, wherein two antennas of the plurality of antennas are arranged on different sides of a radiopaque structure, the method comprising:
    determining an information relating to an opening state of a lid of the electronic device;
    determining an opening angle of the lid; and
    selecting, for transmitting or receiving a signal, the antenna of the plurality of antennas based on:
       a position of an antenna in respect to the radiopaque structure,
       the determined information relating to the opening state, and
       the opening angle of the lid.

12. The method according to claim 11, further comprising selecting, for transmitting or receiving a signal, a second antenna of the plurality of antennas based on the determined opening angle of the lid.

13. The method according to claim 11, further comprising feeding a first antenna of the plurality of antennas and a second antenna of the plurality of antennas with a RF-Switch, wherein either the first antenna or the second antenna is fed separately.

14. A hinge structure for an electronic device comprising:
    a first fastening element mountable to a case;
    a second fastening element mountable to a lid;
    a connecting element for pivotable connecting the first fastening element with the second fastening element, wherein the connecting element comprises two rods and a conducting joint to connect the two rods at one end to form a loop structure; and
    a feeding structure to excite the connecting element.

15. The hinge structure according to claim 14, wherein a length of the connecting element is at least 19 mm and at most 40 mm.

16. The hinge structure according to claim 14, further comprising a keep out zone, wherein this has a radius of at least 2.5 mm.

* * * * *